US010850370B2

(12) United States Patent
Tanaka et al.

(10) Patent No.: US 10,850,370 B2
(45) Date of Patent: Dec. 1, 2020

(54) HOLDING DEVICE, FLIGHT BODY, AND TRANSPORT SYSTEM

(71) Applicant: Kabushiki Kaisha Toshiba, Minato-ku (JP)

(72) Inventors: Junya Tanaka, Ota (JP); Keisuke Kamata, Fuchu (JP); Kohei Nara, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 176 days.

(21) Appl. No.: 16/106,223

(22) Filed: Aug. 21, 2018

(65) Prior Publication Data

US 2019/0283217 A1    Sep. 19, 2019

(30) Foreign Application Priority Data

Mar. 13, 2018    (JP) ................................ 2018-046000

(51) Int. Cl.
*B25B 11/00* (2006.01)
*B25J 15/06* (2006.01)
*B25J 13/08* (2006.01)

(52) U.S. Cl.
CPC ......... *B25B 11/005* (2013.01); *B25J 15/0616* (2013.01); *B25J 13/086* (2013.01)

(58) Field of Classification Search
CPC .... B25J 15/06; B25J 15/0616; B25J 15/0641; B25J 13/08; B25J 13/086; B25J 13/088; B25B 11/005; B23Q 3/088; B23Q 3/08; B23Q 3/00

See application file for complete search history.

(56) References Cited

U.S. PATENT DOCUMENTS

| 4,662,668 | A | * | 5/1987 | Hufford | B25J 13/086 294/185 |
| 4,718,223 | A | * | 1/1988 | Suzuki | A01D 46/30 56/328.1 |
| 4,873,644 | A | * | 10/1989 | Fujii | A01D 46/24 700/219 |
| 5,984,623 | A | * | 11/1999 | Smith | B65G 61/00 294/104 |
| 8,521,339 | B2 | * | 8/2013 | Gariepy | B64C 39/024 244/190 |
| 9,205,922 | B1 | * | 12/2015 | Bouwer | B64D 9/00 |
| 9,517,838 | B1 | * | 12/2016 | Howard | B64C 27/12 |

(Continued)

FOREIGN PATENT DOCUMENTS

| JP | 01218514 A | * | 8/1989 | ......... B25J 15/0616 |
| JP | 1-300822 | | 12/1989 | |

(Continued)

*Primary Examiner* — Tyrone V Hall, Jr.
(74) *Attorney, Agent, or Firm* — Oblon, McClelland, Maier & Neustadt, L.L.P.

(57) ABSTRACT

According to one embodiment, a holding device includes a suction device, a sucker, a light amount sensor, and a controller. The suction device is configured to suction gas. The sucker is configured to communicate with the suction device and to adhere to an object by suction of the suction device. The light amount sensor is configured to two-dimensionally detect an amount of light from the object. The controller is configured to control the suction device on the basis of information detected by the light amount sensor.

16 Claims, 15 Drawing Sheets

(56) References Cited

U.S. PATENT DOCUMENTS

| | | | |
|---|---|---|---|
| 9,650,136 B1* | 5/2017 | Haskin | B64C 39/024 |
| 9,676,477 B1* | 6/2017 | Kimchi | B64C 27/00 |
| 9,811,796 B2 | 11/2017 | Ogilvie et al. | |
| 2004/0094979 A1* | 5/2004 | Damhuis | B25J 15/0052 |
| | | | 294/65 |
| 2005/0168001 A1* | 8/2005 | Perlman | B65G 47/91 |
| | | | 294/189 |
| 2006/0113425 A1* | 6/2006 | Rader | B64C 15/00 |
| | | | 244/17.11 |
| 2006/0247813 A1* | 11/2006 | Takahashi | H05K 13/082 |
| | | | 700/95 |
| 2011/0084162 A1* | 4/2011 | Goossen | B64D 1/22 |
| | | | 244/12.1 |
| 2014/0105717 A1* | 4/2014 | Looi | H05K 13/0409 |
| | | | 414/752.1 |
| 2014/0166816 A1* | 6/2014 | Levien | G05D 1/0088 |
| | | | 244/175 |
| 2015/0158587 A1* | 6/2015 | Patrick | B64C 39/024 |
| | | | 244/137.4 |
| 2016/0023850 A1* | 1/2016 | Kiyama | B25J 19/023 |
| | | | 414/729 |
| 2016/0207195 A1* | 7/2016 | Eto | B25J 9/1612 |
| 2016/0260207 A1* | 9/2016 | Fryshman | B64D 47/08 |
| 2016/0377424 A1* | 12/2016 | Clark | B64C 39/024 |
| | | | 356/600 |
| 2017/0029104 A1* | 2/2017 | Kim | B64C 39/024 |
| 2017/0080571 A1* | 3/2017 | Wagner | B25J 9/1694 |
| 2017/0175413 A1 | 6/2017 | Curlander et al. | |
| 2017/0233073 A1* | 8/2017 | Ao | B64C 39/024 |
| | | | 454/184 |
| 2017/0247109 A1* | 8/2017 | Buchmueller | B64C 39/024 |
| 2018/0072419 A1* | 3/2018 | Burgess | G05D 1/0094 |
| 2018/0194469 A1* | 7/2018 | Evans | B64D 9/00 |
| 2019/0077027 A1 | 3/2019 | Tanaka et al. | |

FOREIGN PATENT DOCUMENTS

| | | |
|---|---|---|
| JP | 2-30481 | 1/1990 |
| JP | 5-31696 | 2/1993 |
| JP | 2000-79588 | 3/2000 |
| JP | 3684522 | 8/2005 |
| JP | 2006-21300 | 1/2006 |
| JP | 2013-107174 | 6/2013 |
| JP | 2013-248721 A | 12/2013 |
| JP | 2017-521781 | 8/2017 |
| JP | 2017-193330 | 10/2017 |
| JP | 2017-193331 A | 10/2017 |
| JP | 2017-213663 | 12/2017 |

* cited by examiner

HOLDING DEVICE, FLIGHT BODY, AND TRANSPORT SYSTEM

CROSS-REFERENCE TO RELATED APPLICATION

This application is based upon and claims the benefit of priority from Japanese Patent Application No. 2018-046000 filed on Mar. 13, 2018; the entire contents of which are incorporated herein by reference.

FIELD

Embodiments described herein relate generally to a holding device, a flight body, and a transport system.

BACKGROUND

A holding device having a suction device and a sucker is known.

Incidentally, an improvement in the reliability of an adhering and holding operation may be expected for the holding device.

DETAILED DESCRIPTION

Figure 1:
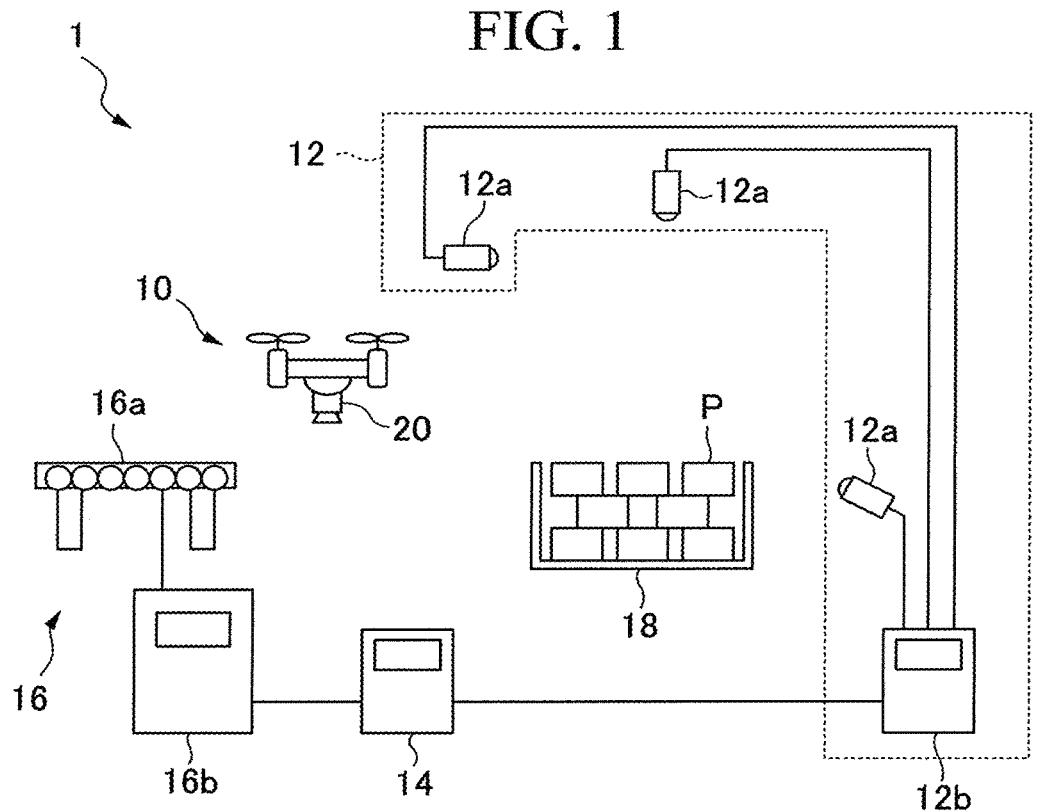
FIG. 1 is a diagram showing a transport system according to a first embodiment.

According to one embodiment, a holding device includes a suction device, a sucker, a light amount sensor, and a controller. The suction device is configured to suction gas. The sucker is configured to communicate with the suction device and to adhere to an object by suction of the suction device. The light amount sensor is configured to two-dimensionally detect an amount of light from the object. The controller is configured to control the suction device on the basis of information detected by the light amount sensor.

Hereinafter, a holding device, a flight body, and a transport system of the embodiments will be described with reference to the drawings.

Identical or similar constituent elements are designated by the same reference numerals throughout the specification and the drawings, and overlapping description will be omitted. It should be noted that the drawings are schematic or conceptual, and the relationship between the thickness and the width of each part, the ratios of sizes between parts, and so on are not necessarily the same as the actual ones. Also, even in the case of representing the same portion, the dimensions and ratios of the part may be represented differently depending on the drawing. In addition, the expression "on the basis of XX" in this application means "on the basis of at least XX" and also includes a case where another element serves as a basis in addition to XX. Further, the expression "on the basis of XX" is not limited to a case where XX is directly used but also includes a case where it is on the basis of what is obtained by performing an operation or processing on XX. "XX" is an arbitrary element (for example, arbitrary information).

First Embodiment

FIG. 1 is a schematic diagram showing an example of a transport system (also referred to as an object transfer system) 1 using a holding device (also referred to as a holding mechanism) 20 according to a first embodiment. As shown in FIG. 1, the transport system 1 includes a flight body 10, a recognition device 12, a flight body controller 14, and a transport device 16. "Transport system" or "object transfer system" broadly means a system for moving an object P. The flight body 10 is an example of a "movement mechanism." The flight body controller 14 is an example of a "movement mechanism controller."

The transport system 1 recognizes a plurality of objects P placed on a loading region 18 by the recognition device 12. The flight body controller 14 controls the flight body 10 on the basis of the result of recognition by the recognition device 12. Accordingly, the flight body 10 holds the object P to be transferred and conveys the object P onto the transport device 16. Conversely, the flight body 10 may be controlled to transfer the object P from the transport device 16 to the loading region 18. The object P may be referred to as a package, an article, a work piece, a target object, an object to be moved, or the like. The object P may be, for example, a product placed in a cardboard box or the like, a packaged product, a product itself, and so on.

First, the flight body 10 will be described.

The flight body 10 is freely movable in a three-dimensional space. The flight body 10 includes a holding device 20 formed to hold the object P. The holding device 20 includes at least one holding unit capable of holding the object P. The holding device 20 is disposed so that the holding unit faces the outside of the flight body 10. The holding unit includes, for example, a sucker pad which holds the object P by adhesion. Further, the holding unit may be of a type in which the holding unit magnetically holds the object P by a magnetic force generated by an electromagnet. The holding device 20 will be described later in detail.

The flight body 10 includes a rotary wing (or propeller) for flying. For example, the flight body 10 can hover while maintaining a certain altitude. A rotary joint of the rotary wing includes, for example, a motor, an encoder, a reduction gear, and so on. The joint is not limited to rotation in one axial direction, and rotation in biaxial directions may be possible. The flight body 10 can move itself to an arbitrary position in the three-dimensional space by driving the motor. Accordingly, it is possible to move the holding device 20 provided in the flight body 10. The flight body 10 is, for example, a so-called drone. The flight body 10 may be a wired type or a wireless type. In a case where the flight body 10 is the wireless type, the flight body 10 is usually equipped with a battery as a power source for flight.

Next, the recognition device 12 will be described.

The recognition device 12 recognizes a plurality of objects P placed on the loading region 18. The recognition device 12 includes an external image sensor 12a, and a calculator 12b connected to the external image sensor 12a. The "image sensor" is a sensor which acquires an image of an object on the basis of light (for example, reflected light; not limited to visible light) from the object. For example, the external image sensor 12a is located directly above or obliquely above the plurality of objects P placed on the loading region 18. A position of the external image sensor 12a may be fixed or may be movable. As the external image sensor 12a, a camera capable of three-dimensional position measurement such as a distance image sensor or an infrared dot pattern projection type camera can be used. The infrared dot pattern projection type camera projects a dot pattern of infrared rays onto an object and takes an infrared image of the object P placed in the loading region 18 in that state. Three-dimensional information of the object P can be obtained by analyzing the infrared image. The infrared dot pattern projection type camera may be capable of taking a color image or a monochrome image. In addition to the infrared dot pattern projection type camera, the external image sensor 12a may include an optical sensor such as a camera which acquires a color image or a monochrome image. For example, the image may be acquired as image data in a commonly used format such as jpg, gif, png, bmp, or the like.

In the example shown in FIG. 1, three external image sensors 12a are provided, but one, two, or four or more external image sensors 12a may be provided. Also, at least one of the external image sensors 12a may be disposed in the flight body 10. The image acquired by the external image sensor 12a disposed in the flight body 10 is transmitted to the calculator 12b by wire or wirelessly.

The calculator 12b calculates a three-dimensional position and posture of the object P on the basis of the image data output from the external image sensor 12a. The "three-dimensional position and posture" is a position and direction of the object P in the three-dimensional space and may include information on a shape of the object P. The position and posture information indicating a calculated position and posture is output to the flight body controller 14. The flight body controller 14 controls the flight body 10 on the basis of the position and posture information. The calculator 12b includes, for example, a central processing unit (CPU), a memory, and an auxiliary storage device. A function of the calculator 12b, for example, a function of calculating the three-dimensional position and posture of the object P, is realized by one or more processors such as a CPU executing a program. A part or all of the functions of the calculator 12b may be realized using hardware (for example, circuitry) such as an application specific integrated circuit (ASIC), a programmable logic device (PLD) and a field programmable gate array (FPGA).

Next, the transport device 16 will be described.

The transport device 16 conveys the object P which has been transferred onto the transport device 16 by the flight body 10. The transport device 16 includes, for example, a belt conveyor 16a and a transport controller 16b. The belt conveyor 16a includes a plurality of rollers arranged in a predetermined direction and a belt wound around the plurality of rollers. The belt conveyor 16a drives the belt by rotating the plurality of rollers and conveys the object P. The transport device 16 may include a roller conveyor or a sorter as an alternative to the belt conveyor 16a.

The transport controller 16b controls driving of the belt conveyor 16a. The transport controller 16b controls, for example, a transport speed and a transport direction. The transport controller 16b is, for example, a computer including a CPU, a memory, and an auxiliary storage device. The transport controller 16b executes a preset program by a processor such as a CPU and controls an operation of the belt conveyor 16a according to the program. The operation of the belt conveyor 16a may be controlled by an operator manually operating the transport controller 16b.

The loading region 18 is a place on which the object P is loaded or placed. The loading region 18 may be a cargo truck, a steel bogie, a box pallet, a pallet, a shelf, or the like.

Next, the holding device 20 will be described with reference to FIGS. 2 to 5.

Figure 2:
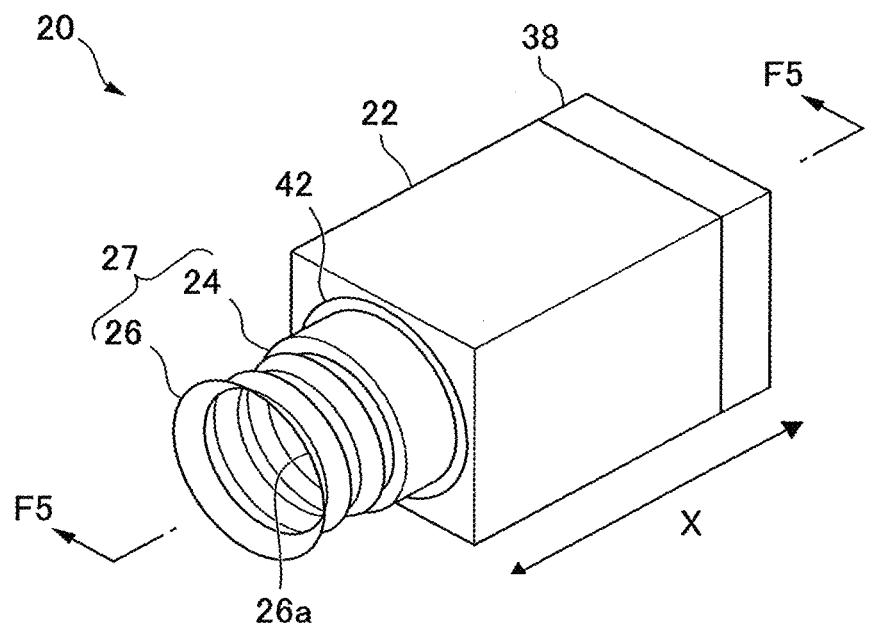
FIG. 2 is a perspective view showing a holding device of the first embodiment.
Figure 3:
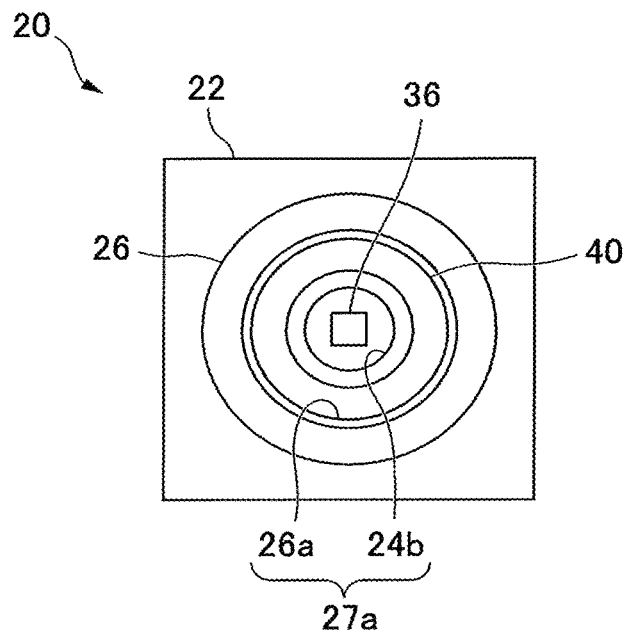
FIG. 3 is a front view showing the holding device of the first embodiment.
Figure 4:
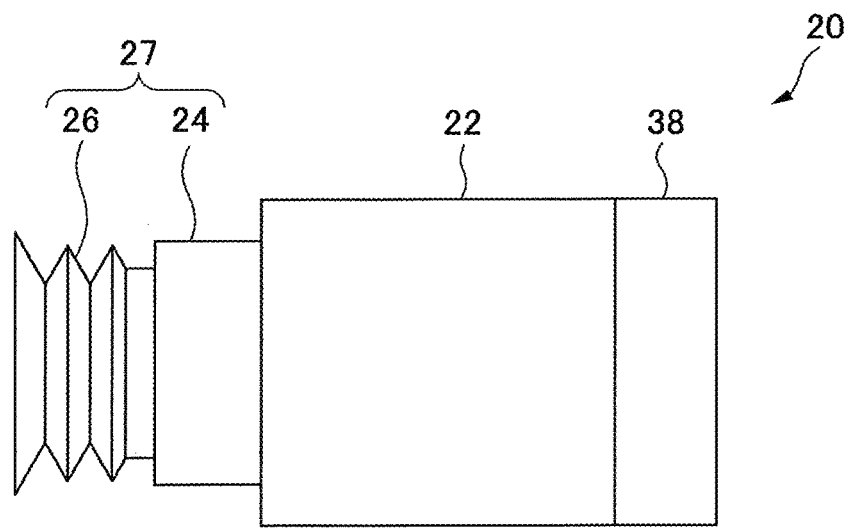
FIG. 4 is a side view showing the holding device of the first embodiment.
Figure 5:
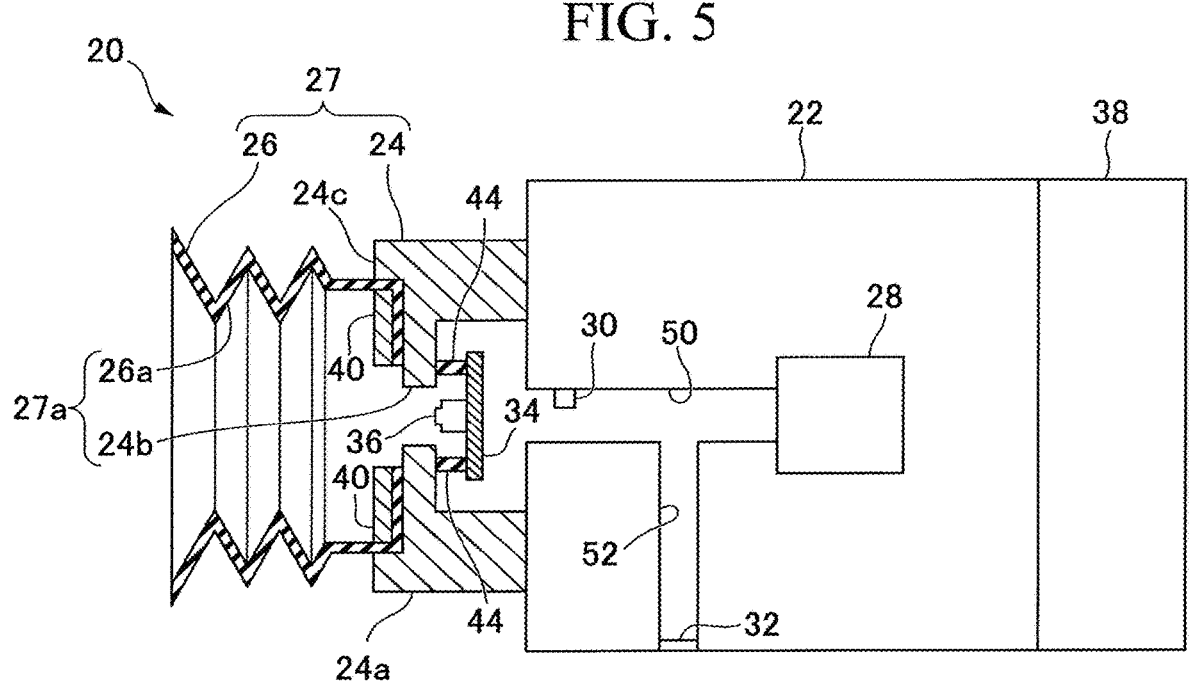
FIG. 5 is a cross-sectional view of the holding device taken along line F5-F5 shown in FIG. 2.

FIGS. 2 to 4 are a perspective view, a front view and a side view showing the holding device 20, respectively. FIG. 5 is a cross-sectional view of the holding device 20 taken along line F5-F5 in FIG. 2. As shown in FIGS. 2 to 4, the holding device 20 includes a housing 22, a support member 24, a sucker pad (also referred to as a suction cup) 26, a suction device 28, a pressure sensor 30, a switching valve 32, an image sensor board 34, and an image sensor 36. In this example, the number of image sensors 36 is one, but two or more may be used. Further, a plurality of sucker pads 26 may be provided. The holding device 20 may be autonomously and independently operated by including a controller and a power supply unit. The sucker pad 26 is an example of a "sucker." The image sensor 36 is an example of a "light amount sensor." The "light amount sensor" is a sensor for detecting an amount of incident light and includes an image sensor such as a camera. The image sensor 36 can detect the amount of light two-dimensionally. Here, "two-dimensionally detecting" means that detection is performed at at least two points in each direction in a plane defined by two spatial directions crossing each other. For example, photographing with a general camera corresponds to detection of a two-dimensional light amount distribution. Image capturing by the image sensor 36 is an example of the "two-dimensional detection of the light amount."

The housing 22 has a rectangular parallelepiped shape which extends in a lengthwise direction X and accommodates elements such as a controller 60 and a power supply unit 62 to be described later in addition to the suction device 28. A shape of the housing 22 is not limited to a rectangular parallelepiped shape and may be any three-dimensional shape capable of accommodating contents such as a cylindrical shape. An attachment unit 38 to be attached to a main body of the flight body 10 is provided on one side of the housing 22.

The support member 24 is a cylindrical member which is provided at the housing 22 on the side opposite to the attachment unit 38 and extends in the lengthwise direction X. The sucker pad 26 is attached to the end of the support member 24. As shown in FIG. 5, an inner diameter of the support member 24 is reduced at an end portion 24a of the support member 24, and an air hole 24b is formed. Here, the "air hole" is a hole through which a fluid such as air can pass between both sides of the hole (here, between the inside and the outside of the housing 22). Further, an outer edge 24c of the support member 24 protrudes in the lengthwise direction X at the end portion 24a of the support member 24 and surrounds the sucker pad 26. Furthermore, a ring-shaped sucker pad fixing member 40 is provided to fix the sucker pad 26 to the support member 24. The sucker pad 26 is interposed between the support member 24 and the sucker pad fixing member 40 and fixed to the support member 24. A shape of the support member 24 is not limited to a cylindrical shape. A shape of the air hole 24b is not limited to a circular shape. In addition, a ring-shaped lighting device 42 is provided around a connection portion between the housing 22 and the support member 24. The lighting device 42 is disposed outside the sucker pad 26 and emits light from the housing 22 toward the support member 24 and the sucker pad 26 (or toward the object P). The lighting device 42 is, for example, a light emitting diode (LED) or a fluorescent lamp. A position of the lighting device 42 is not limited to the above-described example. The lighting device 42 may be provided on the housing 22 or any place on the support member 24 or on the flight body 10.

The sucker pad 26 is attached to the support member 24 as described above. The sucker pad 26 has a bellows shape which can be deformed. Here, the "bellows shape" is a pleated cylindrical shape formed to be expandable and contractible by alternately repeating mountain and valley folds. The shape of the sucker pad 26 is not limited to the bellows shape and may be an arbitrary shape capable of adhering to the object P. The sucker pad 26 can adhere to one surface of the object P and can hold the object P. The sucker pad 26 can be deformed in a case where the sucker pad 26 adheres to the object P. The sucker pad 26 has a cavity 26a therein through which air or the like can pass and the sucker pad 26 communicates with the suction device 28 inside the housing 22 via the air hole 24b of the support member 24. In the embodiment, the sucker pad 26 and the support member 24 are collectively referred to as an "adhesion unit 27." Further, the cavity 26a of the sucker pad 26 and the air hole 24b of the support member 24 are collectively referred to as a "hollow portion 27a."

The suction device 28 is provided inside the housing 22. The suction device 28 communicates with the sucker pad 26 via a first tube 50 extending from the suction device 28 toward the support member 24 and the air hole 24b of the support member 24. The first tube 50 extends to one surface of the housing 22 in which the support member 24 is provided and forms a flow path through which a fluid (for example, gas) flows between the suction device 28 and the sucker pad 26. As the suction device 28, for example, a vacuum pump can be used. Alternatively, a suction device for generating a negative pressure by combining a pressurizing device and a vacuum generator may be used. Considering that the holding device 20 is mounted in the flight body 10, it is desirable that the suction device 28 be small. It is desirable that the first tube 50 not be collapsed by suction of the suction device 28.

The pressure sensor 30 is attached to the first tube 50. The pressure sensor 30 detects a pressure of gas inside the first tube 50.

The switching valve 32 is provided inside a second tube 52 (for example, the end of the second tube 52) which branches from the first tube 50 and extends to a side surface of the housing 22. The second tube 52 forms a flow path through which gas flows between the suction device 28 and an atmospheric pressure space. In other words, the first tube 50 connected to the sucker pad 26 and the second tube 52 connected to the switching valve 32 join together and are connected to the suction device 28. The first tube 50 connected to the sucker pad 26 and the second tube 52 connected to the switching valve 32 communicate with each other in the suction device 28. The switching valve 32 is switched by a switching valve drive circuit 66 to be described later between an open state in which the valve is completely opened and the inside of the second tube 52 and the atmospheric pressure space communicate with each other and a closed state in which the valve is completely closed and the inside of the second tube 52 and the atmospheric pressure space do not communicate with each other. In addition to the open state and the closed state, the switching valve 32 may be capable of being held with the valve partially opened between the open state and the closed state. As the switching valve 32, for example, a combination of an electromagnetic solenoid and a blocking plate member or a combination of an electromagnetic rotary motor and a flow path blocking plate member may be used, and an arbitrary mechanism may also be used as long as it can perform the function of a valve for switching between the open state and the closed state.

The image sensor board 34 is a circuit board of the image sensor 36. The image sensor board 34 is supported by the support member 24 via a plurality of elastic members 44. The image sensor 36 is mounted on the main surface (also referred to as a detection surface) of the image sensor board 34. The image sensor board 34 is disposed behind the sucker pad 26. Here, the expression "disposed behind the sucker pad" means that it is disposed downstream of the sucker pad 26 in a suctioning direction. That is, the image sensor board 34 is disposed inside the support member 24. However, the image sensor board 34 may be disposed inside the sucker pad 26 which is located upstream of the support member 24 in the suctioning direction. In other words, the image sensor board 34 and the image sensor 36 are located inside an enclosed space formed by the housing 22, the support member 24, the sucker pad 26 and the object P. That is, the image sensor board 34 and the image sensor 36 are located inside the adhesion unit 27. More specifically, the image sensor board 34 and the image sensor 36 are disposed in the hollow portion 27a of the adhesion unit 27. The image sensor board 34 has, for example, a rectangular shape, but may have any shape as long as a flow path is ensured between the sucker pad 26 and the suction device 28. The main surface of the image sensor board 34 faces the sucker pad 26. The elastic member 44 is four struts formed of an elastic material (for example, rubber) and connects the image sensor board 34 with the support member 24. The number and constitution of the elastic members 44 are not limited thereto.

The image sensor 36 is mounted on the image sensor board 34. The image sensor board 34 and the image sensor 36 are provided at positions at which the image sensor 36 is visible from the outside through the cavity 26a of the sucker pad 26. That is, the image sensor 36 is provided at a position at which the image sensor 36 can photograph the outside of the sucker pad 26 through the cavity 26a of the sucker pad 26. The image sensor 36 is, for example, a passive type image sensor (for example, a camera). Here, the "passive type sensor" is a sensor which reads a signal or the like from an object (for example, reflected light from an object) without performing an active act on the object (for example, light irradiation on the object). The image sensor 36 includes, for example, an aggregate of extremely small sized elements which read light such as CCD elements, CMOS elements or the like, and a lens which condenses incident light. Light from the object to be photographed forms an image on the element through an optical system such as a lens. The image sensor 36 can detect the amount of light imaged on each element and convert it into an electric signal. The image sensor 36 generates image data on the basis of the electric signal. Further, a feature portion in the image can be extracted, for example, by specifying a discontinuous change in a brightness of the image in the obtained image. Specifically, it is possible to calculate a feature amount such as a size, an area, a position, a center of gravity of the object by detecting an edge or the like of the object in the image. Further, it is also possible to extract a size and position of a feature (for example, a pattern, a printed symbol, a label, a tape, a protrusion, a concave, and so on) on the surface of the object. In this manner, it is possible to measure the feature amount of the object in a non-contact manner on the basis of the image data acquired by the image sensor 36. Such image processing may be performed by the image sensor 36 or may be performed by a controller 60 or the like to be described later.

The image sensor 36 can be used to detect a state in which the object P is in proximity to the sucker pad 26. The sucker pad 26 and the image sensor 36 are located on the main surface side of the image sensor board 34, and the approach of the object P to the image sensor 36 can be regarded as the approach of the object P to the sucker pad 26. The arrangement of the image sensor 36 is not limited to the example shown in FIG. 5 and may take various forms.

Figure 6:
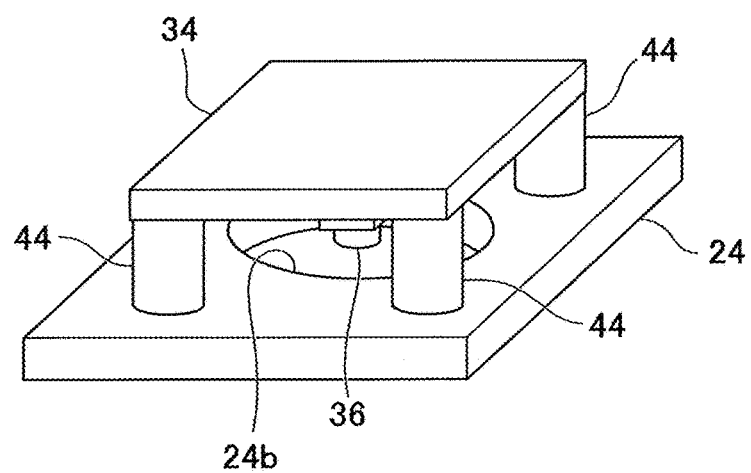
FIG. 6 is a perspective view showing a support member and an image sensor board according to the first embodiment.

FIG. 6 shows an arrangement example of the image sensor 36. It is preferable that the image sensor 36 is provided at the center of the sucker pad 26 in a plane substantially orthogonal to an adhering direction of the sucker pad 26 in order to secure an angle of view. In FIG. 6, the image sensor board 34 is provided on the flow path inside the sucker pad 26. Four corners of the image sensor board 34 are supported by the elastic member 44 and a distance is provided between the support member 24 having the air hole 24b and the image sensor board 34 so that the image sensor board 34 does not block the flow path. The air suctioned from the external environment into the sucker pad 26 by the suction device 28 passes through the air hole 24b, then passes from a space between the air hole 24b and the image sensor board 34 through a space between the elastic members 44 toward the suction device 28. A fixing method of the image sensor board 34 is not limited to the constitution shown in FIG. 6 and may have any constitution in which a flow path is secured. Further, in a case where wiring or the like from the image sensor 36 disposed inside the sucker pad 26 extends to the outside of the sucker pad 26, for example, a through-hole is provided in the support member 24 to communicate the inside (closed space to which a negative pressure is applied) of the sucker pad 26 with the outside (atmosphere). The wiring or the like can extend from the inside of the sucker pad 26 to the outside by passing the wiring or the like through the through-hole. In such a case, in order to prevent air leakage from the through-hole, it is desirable to fill the through-hole by applying an adhesive or the like.

Figure 7:
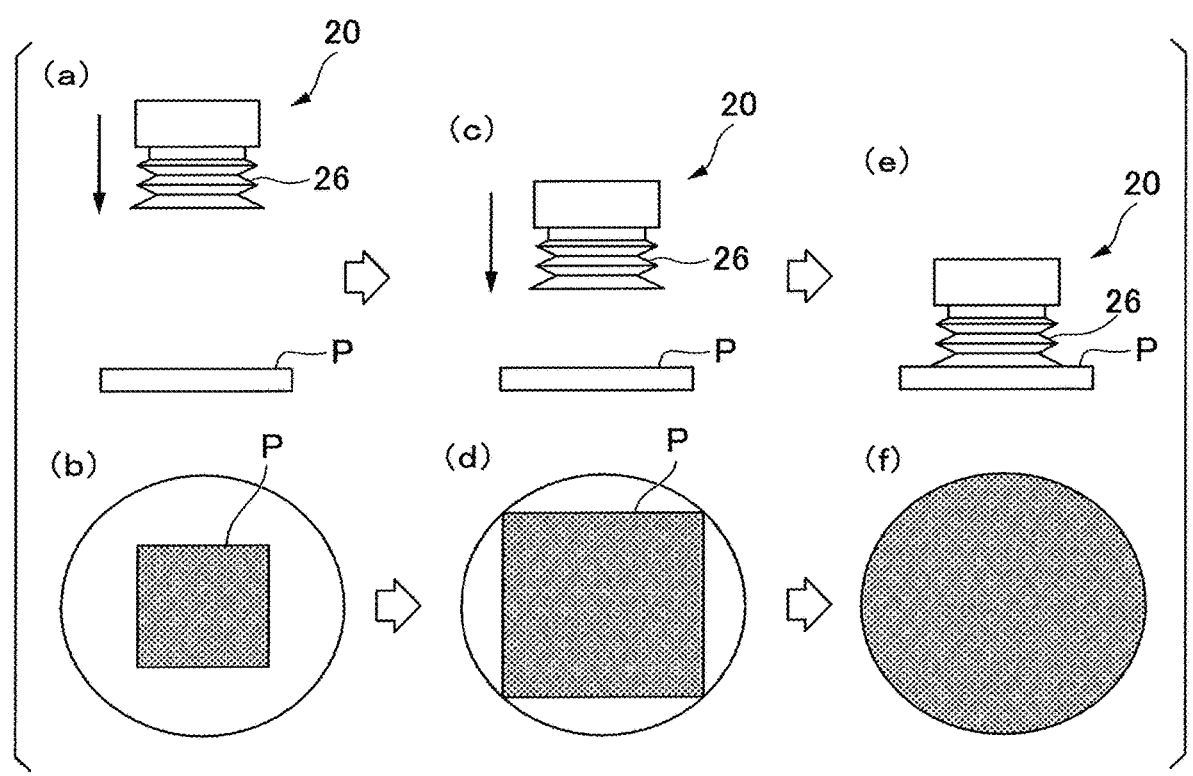
FIG. 7 is a diagram showing an example of proximity determination between a sucker pad and an object using an image sensor of the first embodiment.

FIG. 7 shows an example of proximity determination between the sucker pad 26 and the object P using the image sensor 36. (a) in FIG. 7 shows a state in which the sucker pad 26 is away from the object P, and (b) in FIG. 7 shows a schematic view of an image acquired by the image sensor 36 inside the sucker pad 26 in the state shown in (a) in FIG. 7. (c) in FIG. 7 shows a state in which the sucker pad 26 is approaching the object P, and (d) in FIG. 7 shows a schematic view of an image acquired by the image sensor 36 in the state shown in (c) in FIG. 7. (e) in FIG. 7 shows a state in which the sucker pad 26 is in contact with the object P, and (f) in FIG. 7 shows a schematic view of an image acquired by the image sensor 36 in the state shown in (e) in FIG. 7.

As shown in FIG. 7, as the sucker pad 26 approaches the object P, a ratio of an area occupied by the object P within the angle of view of the image sensor 36 increases. That is, a ratio of the area of the object P to the entire image acquired by the image sensor 36 increases. On the basis of this, it is possible to estimate a distance between the sucker pad 26 and the object P.

Specifically, a reference table listing the correspondence between the distance in a height direction between the sucker pad 26 and the object P and the ratio of the area of the object P to the entire image of the image sensor 36 in a case where the flight body 10 is located above the object P is created for the object P of various sizes in advance. This reference table is stored in advance in the controller 60 or the holding device 20. At the time of actual transfer, the size of the object P to be transferred is estimated by the recognition device 12. The controller 60 can estimate the distance between the sucker pad 26 and the object P with reference to the reference table on the basis of the size of the object P estimated by the recognition device 12 and the ratio of the area of the object P to the entire image of the image sensor 36.

Alternatively, information on the distance between the sucker pad 26 and the object P acquired by the recognition device 12 at a first timing is associated with an image of the image sensor 36 at substantially the same first timing. Further, information on the distance between the sucker pad 26 and the object P acquired by the recognition device 12 at a second timing different from the first timing is associated with an image of the image sensor 36 at substantially the same second timing. The controller 60 can estimate the relationship between the distance between the sucker pad 26 and the object P and the ratio of the area of the object P to the entire image of the image sensor 36 on the basis of these two correspondence relationships. The controller 60 can estimate the distance between the sucker pad 26 and the object P from the ratio of the area of the object P to the entire image of the image sensor 36 at an arbitrary timing on the basis of such estimated relationship (for example, by extrapolation or interpolation).

The distance between the sucker pad 26 and the object P may be estimated on the basis of a change in a size (for example, length or width) of all or a part of the object P or a change in a size of the feature on the surface of the object P instead of the entire area of the object P.

Further, in a case where the sucker pad 26 adheres to the object P, the inside of the sucker pad 26 becomes a closed space and external light is attenuated or blocked by the sucker pad 26, and thus the amount of light detected by the image sensor 36 changes before and after the adhesion. Therefore, it is possible to determine an adhesion state between the sucker pad 26 and the object P on the basis of the change in the amount of light detected by the image sensor 36. In a case where the amount of light received by a light detecting element of the image sensor 36 is equal to or greater than a first light amount threshold, it can be determined that the sucker pad 26 does not adhere to the object P. In a case where the amount of light received by the light detecting element of the image sensor 36 is less than or equal to a second light amount threshold, it can be determined that the sucker pad 26 is adhering to the object P. The second light amount threshold is substantially equal to or smaller than the first light amount threshold.

Furthermore, in a case where the object P is held by the sucker pad 26, if the holding state of the object P changes, the amount of light detected by the image sensor 36 inside the sucker pad 26 can change. For example, in a case where the amount of light detected by the image sensor 36 changes to exceed the first light amount threshold, it can be determined that there is no object P held by the sucker pad 26. In this case, it can be determined that the object P has fallen. In this way, it is also possible to detect the falling of the object P while the object P is being conveyed. Further, for example, also in a case where a temporal change in the amount of light detected by the image sensor 36 is large, it can be determined that some change has occurred in the holding state of the object P.

Only one image sensor 36 is provided in the embodiment, but two or more image sensors may be provided to realize a wider field of view or to enable stereoscopic viewing of the object P.

Next, control of the holding device 20 will be described with reference to FIG. 8.

Figure 8:
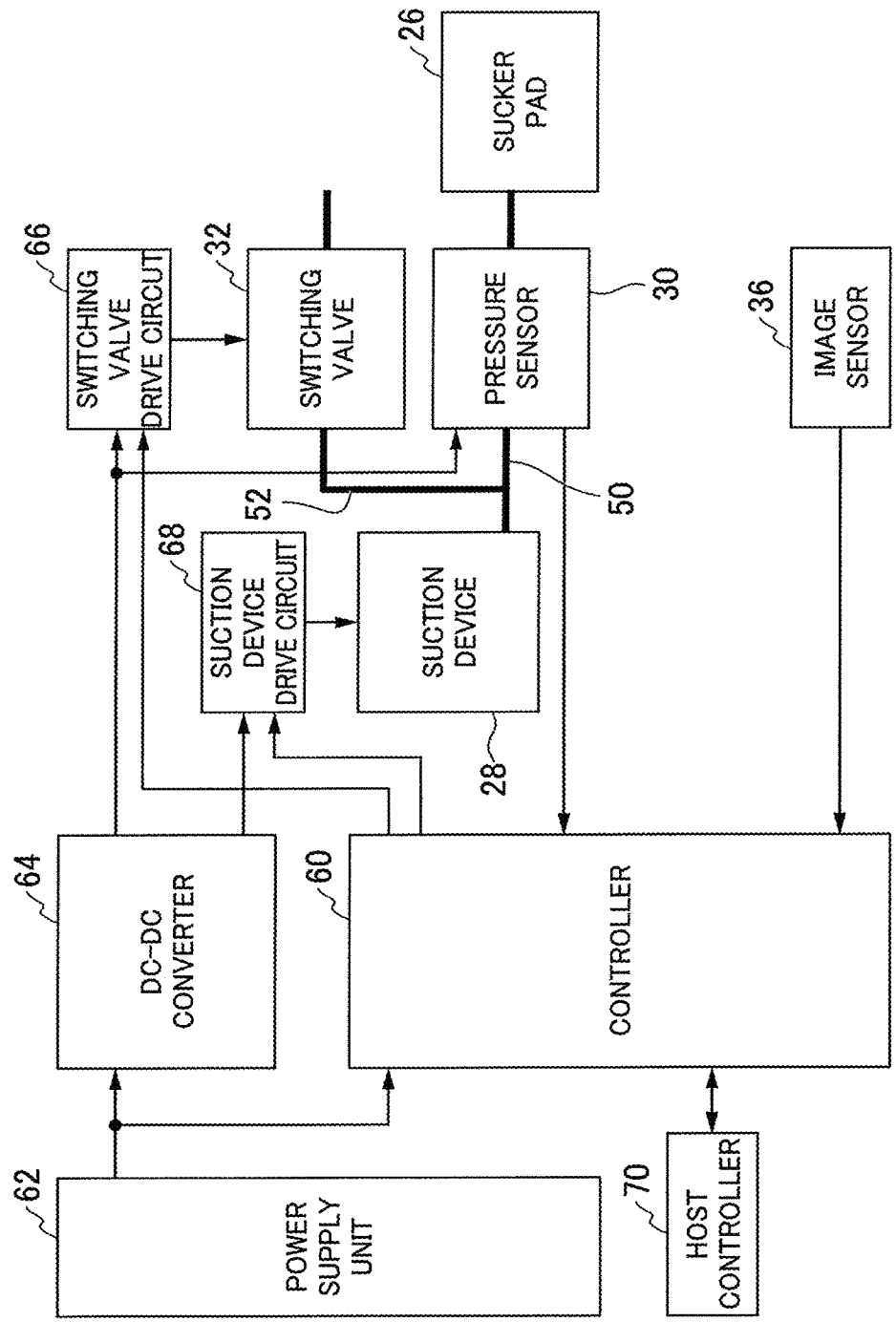
FIG. 8 is a block diagram showing a system constitution of the holding device of the first embodiment.

FIG. 8 is a block diagram showing a control system of the holding device 20. The holding device 20 further includes the controller (also referred to as a control unit) 60, the power supply unit 62, a DC-DC converter 64, the switching valve drive circuit (switching valve driver circuit) 66, and a suction device drive circuit (suction device driver circuit) 68. These elements are accommodated inside the housing 22. These elements may be disposed outside the housing 22.

The controller 60 controls the suction device 28 and the switching valve 32. Specifically, the controller 60 transmits a drive command which selectively instructs the suction device drive circuit 68 to drive and stop the suction device 28. Similarly, the controller 60 transmits a drive command which instructs the switching valve drive circuit 66 on switching of the switching valve 32 between the open state and the closed state.

In order to supply gas from the atmosphere to the flow path and to make the pressure inside the sucker pad 26 substantially equal to atmospheric pressure, the controller 60 brings the switching valve 32 into the open state and brings the inside of the first tube 50 and the atmospheric pressure space into communication. On the other hand, in order to suction the gas to the sucker pad 26, the controller 60 brings the switching valve 32 into the closed state. In this state, the suction device 28 suctions gas from the sucker pad 26 through the first tube 50.

The controller 60 determines whether to continue the suction of the suction device 28 on the basis of the pressure detected by the pressure sensor 30 provided in the first tube 50. For example, in a case where the pressure inside the first tube 50 detected by the pressure sensor 30 is lower than a first pressure threshold, the controller 60 determines that the pressure inside the first tube 50 is sufficiently low and stops the driving of the suction device 28. Further, the controller 60 determines whether or not the holding of the object P by the sucker pad 26 is successful on the basis of the pressure detected by the pressure sensor 30. For example, in a case where the pressure detected by the pressure sensor 30 is higher than a second pressure threshold after the holding operation is performed, or in a case where a pressure change before and after the holding operation is equal to or less than a pressure change threshold, the controller 60 can determine that the holding of the object P has failed. Here, the first pressure threshold is substantially equal to or greater than the second pressure threshold. A flow rate sensor may be provided instead of or in addition to the pressure sensor 30. The flow rate sensor detects a flow rate of the gas inside the first tube 50, and the controller 60 may determine whether to continue the suction of the suction device 28 on the basis of the flow rate detected by the flow rate sensor.

The controller 60 transmits a sensor signal from the pressure sensor 30 or information indicating a driving state of the suction device 28 and the switching valve 32 to a host controller 70 by wire or wirelessly. The host controller 70 includes, for example, a flight body controller 14 and/or a controller 60 in the flight body 10. The holding device 20 may be used as an Internet of Things (IoT) device.

The power supply unit 62 is, for example, a rechargeable battery. The power supply unit 62 supplies electric power to the controller 60, the pressure sensor 30, the switching valve drive circuit 66, and the suction device drive circuit 68. The DC-DC converter 64 transforms the electric power supplied from the power supply unit 62. The pressure sensor 30, the switching valve drive circuit 66, and the suction device drive circuit 68 receive the electric power from the power supply unit 62 via the DC-DC converter 64. The holding device 20 may share the power supply unit 62 with the flight body 10, or a power supply unit 62 dedicated to the holding device 20 may be provided.

Next, the control of the holding device 20 by the controller 60 will be described in more detail with reference to FIG. 9.

Figure 9:
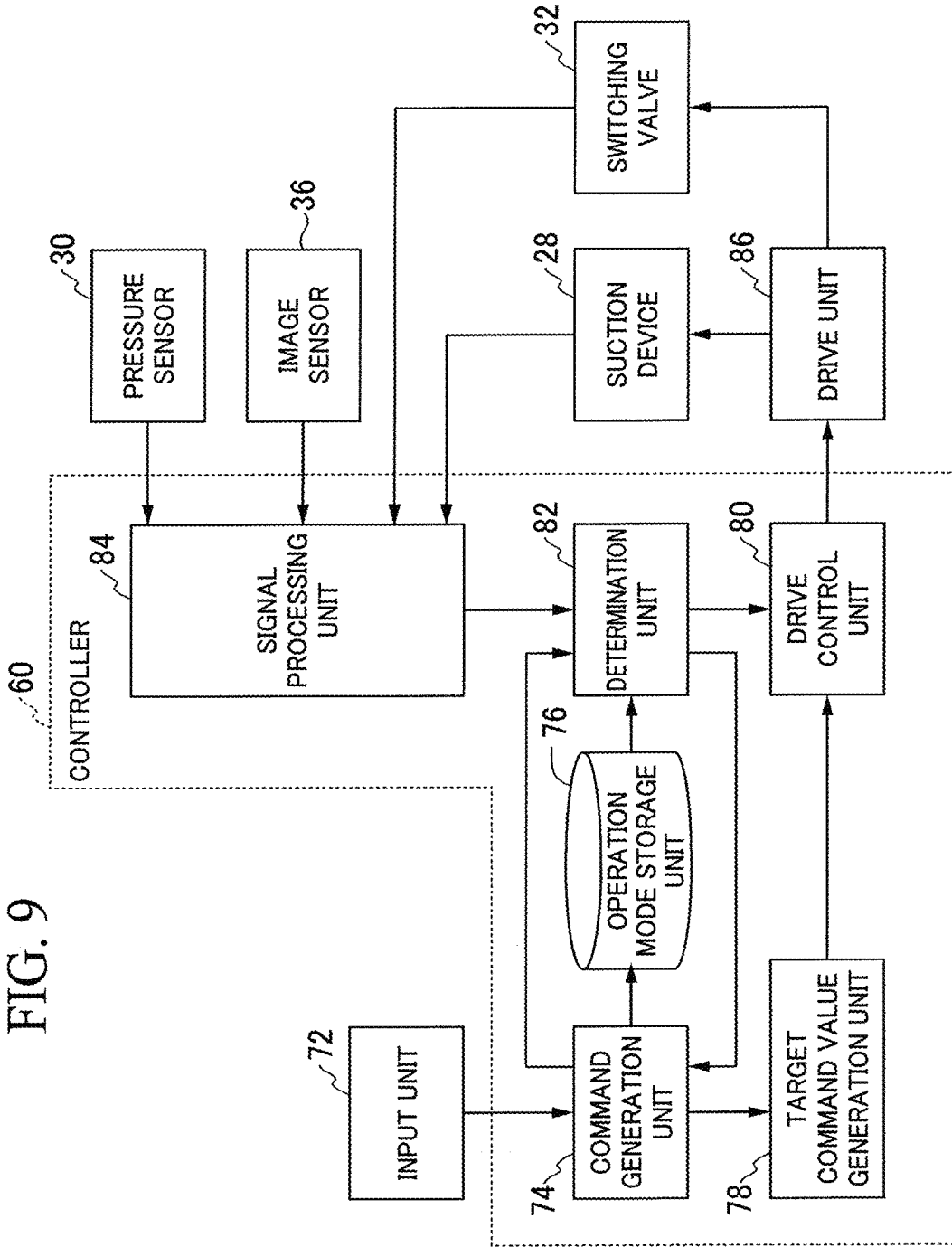
FIG. 9 is a block diagram showing details of the system constitution of the holding device of the first embodiment.

FIG. 9 is a block diagram showing details of the control of the holding device 20 by the controller 60. As shown in FIG. 9, the controller 60 includes a command generation unit 74, an operation mode storage unit 76, a target command value generation unit 78, a drive control unit 80, a determination unit 82, and a signal processing unit 84. The controller 60 receives an input from an input unit 72 and performs output to a drive unit 86. The drive unit 86 includes the switching valve drive circuit 66 and the suction device drive circuit 68 shown in FIG. 8.

The input unit 72 transmits an operation command to the command generation unit 74. The command generation unit 74 generates an operation procedure required for each work process as an operation command according to the operation command. The command generation unit 74 transmits operation mode information corresponding to the operation command to be executed to the operation mode storage unit 76. The operation mode storage unit 76 stores the operation mode information. The operation mode storage unit 76 further stores attribute data such as a shape, a weight, flexibility, and so on of the object P to be transferred. The operation mode is, for example, an operation of setting the switching valve 32 to the open state, an operation of setting the switching valve 32 to the closed state, an operation of driving the suction device 28, an operation of stopping the driving of the suction device 28, and so on. Further, the operation command generated may be changed on the basis of a detection result of the image sensor 36. For example, in order to minimize the sucker pad 26 from accidentally adhering to another object P in a case where the object P is mixed with other objects, the command generation unit 74 may generate the operation command so that the adhering operation is started in a case where the image acquired by the image sensor 36 and the image of the object P registered in advance coincide with each other to some extent.

The operation command from the input unit 72 is a command related to a series of operations of the holding device 20 and is held in the controller 60 in the form of, for example, a program. The operation command may be generated by an operator touching a command displayed on a panel by the input unit 72 or may be generated by the voice of the operator. The input unit 72 may be integral with the flight body 10 or may be one capable of transmitting a command to the flight body 10 by wire or wirelessly.

The target command value generation unit 78 receives an operation command for the switching valve 32 or the suction device 28 from the command generation unit 74. The target command value generation unit 78 calculates a target value of the switching valve 32 or the suction device 28 and generates a target command value relating to the driving of the switching valve 32 or the suction device 28.

The drive control unit 80 receives the target command value of the switching valve 32 or the suction device 28 from the target command value generation unit 78 and generates a drive instruction for driving the switching valve 32 or the suction device 28 according to the target command value.

The drive unit 86 receives the drive instruction of the switching valve 32 or the suction device 28 from the drive control unit 80 and generates a drive output of the switching valve 32 or the suction device 28. The switching valve 32 receives the drive output from the drive unit 86 and adjusts an amount or characteristic (communicating with a negative pressure side or communicating with atmospheric pressure) of the supplied gas.

The suction device 28 receives the drive output from the drive unit 86 and starts or stops the suctioning according to the drive output.

The pressure sensor 30 senses the suctioning operation of the sucker pad 26 and generates a sensor signal. The sensor signal is, for example, a voltage signal. The image sensor 36 senses the intensity and wavelength of light incident on the image sensor 36 and generates a sensor signal corresponding to image data based thereon. The sensor signal is, for example, a voltage signal. In the embodiment, the controller 60 performs the estimation of the distance between the sucker pad 26 and the object P and the proximity determination between the sucker pad 26 and the object P on the basis of the image data acquired by the image sensor 36. However, instead of the controller 60, the image sensor 36 may perform such estimation and determination.

The signal processing unit 84 receives the sensor signals from the pressure sensor 30 and the image sensor 36 and performs signal processing including signal amplification and analog/digital conversion on the sensor signals.

The determination unit 82 receives the sensor signal converted from the signal processing unit 84. In accordance with the sensor signal, the determination unit 82 determines necessity of adjustment of the gas supply or whether or not the object P is held. The determination unit 82 receives the operation mode information from the command generation unit 74 according to the determination result. The determination unit 82 extracts the operation of the switching valve 32 corresponding to the operation mode information from the operation mode storage unit 76. The determination unit 82 generates commands such as switching between the open state and the closed state of the switching valve 32. The determination unit 82 generates a return value command for correcting the target value with respect to the command generation unit 74. The command generation unit 74 can perform a corresponding processing operation suitable for a current operation by the return value command and can secure the reliability and certainty of the operation of the holding device 20.

A part or all of the functions of the controller 60 described above may be realized by the flight body controller 14 or may be realized by the controller 60 in the flight body 10.

Next, an operation example of the holding device 20 will be described with reference to FIG. 10.

Figure 10:
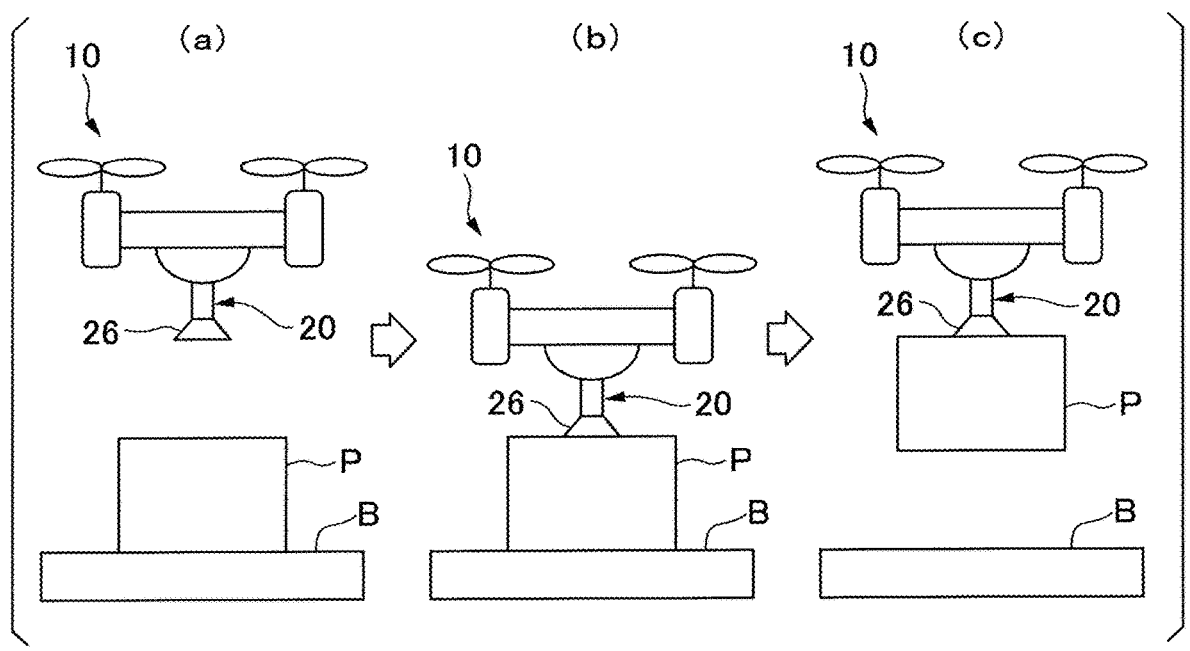
FIG. 10 is a view showing an operation example of the holding device of the first embodiment.

FIG. 10 is a diagram showing the operation example of the holding device 20. (a) in FIG. 10 shows a state in which the sucker pad 26 is approaching the object P, (b) in FIG. 10 shows a state in which the sucker pad 26 is in contact with the object P, and (c) in FIG. 10 shows a state in which the sucker pad 26 holds and conveys the object P. In FIG. 10, the object P is an object to be transferred and is placed on a loading table B.

(1) Approach

The flight body 10 moves toward the object P. Specifically, the flight body 10 moves above the object P and then moves down. In a case where the approach of the object P is detected on the basis of the image acquired by the image sensor 36 of the holding device 20, the controller 60 drives the suction device 28 in advance and starts evacuating the inside of the sucker pad 26 to quickly adhere to the object P. The controller 60 drives the suction device 28 in a case where the distance from the sucker pad 26 to the object P estimated on the basis of the image from the image sensor 36 becomes less than a distance threshold.

The distance threshold can be calculated from the change in the area occupied by the object P in the image of the image sensor 36. For example, the distance threshold is set so that the driving of the suction device 28 is started immediately before the object P comes into contact with an adhering surface of the sucker pad 26. The distance threshold is, for example, about 10 cm to 1 m. The distance threshold is set, for example, so that the suction device 28 is driven 1 to 2 seconds before the sucker pad 26 comes into contact with the object P. The distance threshold may be a variable value or may not be a variable value. For example, the distance threshold can be adjusted according to a moving speed of the flight body 10, that is, a moving speed of the sucker pad 26. Specifically, the distance threshold is set to a large value in a case where the moving speed of the flight body 10 is high, and is set to a small value in a case where the moving speed of the flight body 10 is low. The distance threshold may be continuously adjusted relative to the moving speed or may be adjusted in stages relative to the moving speed. The moving speed of the flight body 10 may be acquired from the host controller 70 or may be calculated on the basis of a sensor signal output from an acceleration sensor 94 provided in the holding device 20 as will be described later in a third embodiment.

(2) Contact and Adhesion

The controller 60 detects the contact of the object P with the sucker pad 26 on the basis of the sensor signal from the image sensor 36, continues the adhering operation and monitors the pressure. For example, in a case where the brightness of the image acquired by the image sensor 36 is lower than a certain value, the controller 60 can determine that the object P has come into contact with the sucker pad 26. The controller 60 may stop the driving of the suction device 28 in a case where the pressure becomes lower than a predetermined pressure threshold (a preset degree of vacuum). In a case where the sucker pad 26 adheres to a non-porous object P, the time during which the degree of vacuum of the sucker pad 26 is maintained is long even in a case where the driving of the suction device 28 is stopped. On the other hand, in a case where the sucker pad 26 adheres to a porous object P, since air enters the sucker pad 26 in a case where the driving of the suction device 28 is stopped, the time during which the degree of vacuum in the sucker pad 26 is maintained is short. Therefore, the controller 60 intermittently drives the suction device 28 while monitoring the pressure.

(3) Conveyance

The controller 60 controls the movement of the flight body 10 to convey the object P while intermittently driving the suction device 28 by monitoring the degree of vacuum. For example, the flight body 10 moves up and then moves laterally. The controller 60 transmits information including the sensor signals output from the image sensor 36 and the pressure sensor 30 to the host controller 70 as necessary. The host controller 70 confirms the holding state on the basis of the information received from the holding device 20. The host controller 70 performs schedule management of the entire transfer work, operation management of the flight body 10, and so on.

(4) Release

In a case where the flight body 10 conveys the object P to a destination (for example, the transport device 16 shown in FIG. 1), the controller 60 opens the switching valve 32 to bring the atmospheric pressure space and the sucker pad 26 into communication. Therefore, the vacuum in the sucker pad 26 is broken, and the object P is released from the sucker pad 26. At this time, the suction device 28 is stopped. Whether the object P is released or not can be determined on the basis of the sensor signals output from the image sensor 36 and the pressure sensor 30 as necessary. For example, in a case where the brightness of the image acquired by the image sensor 36 exceeds a certain value or in a case where the pressure acquired by the pressure sensor 30 increases to a certain value (for example, a value of the degree of atmospheric pressure), the controller 60 can determine that the object P has been released.

Next, with reference to FIG. 11 and FIG. 12, an operation example of the flight body 10 will be described in more detail using an operation flow.

Figure 11:
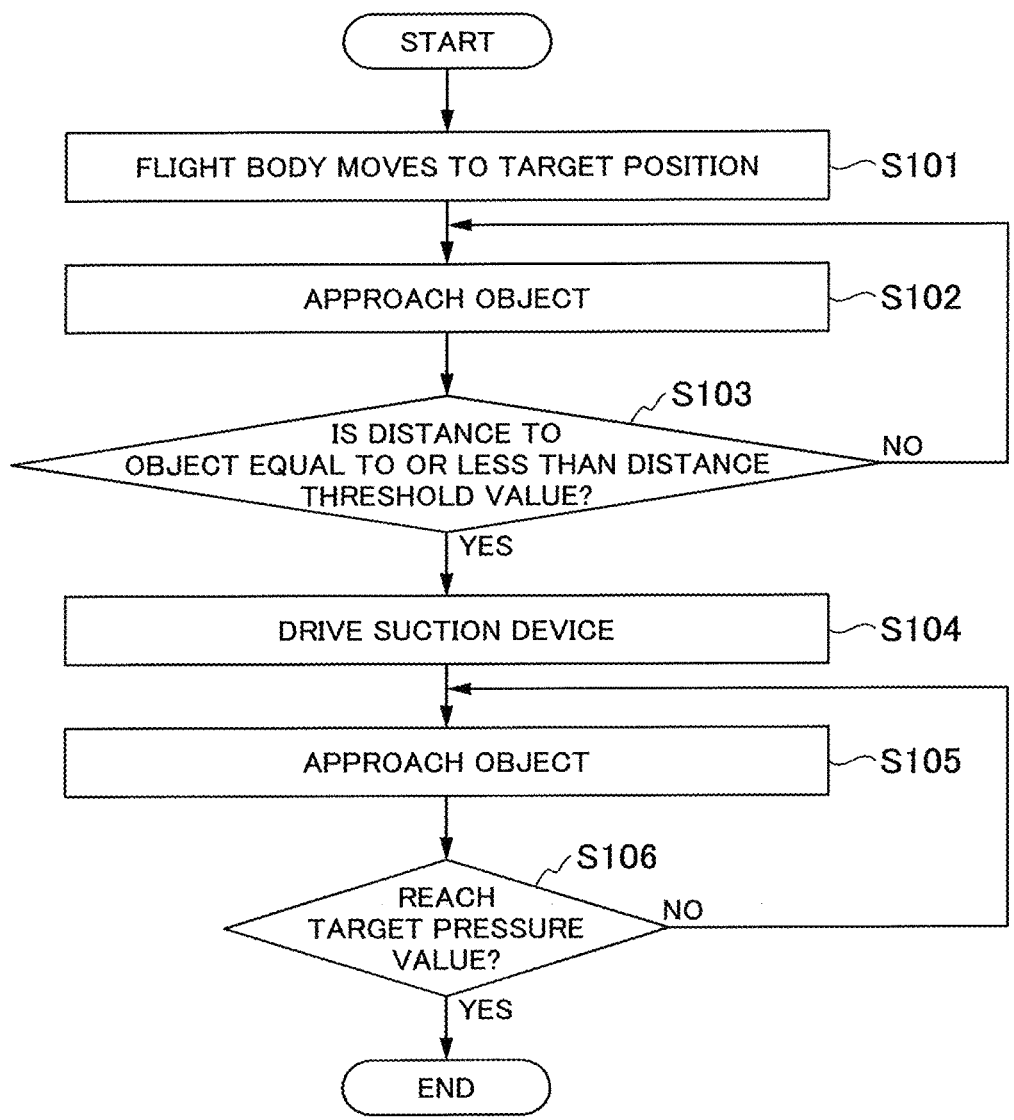
FIG. 11 is a flowchart showing an operation flow from approaching an object to holding the object by means of a flight body of the first embodiment.

FIG. 11 shows an operation flow from the approach of the flight body 10 to the object P to the holding of the object P. First, the flight body 10 moves to a target position under the control of the flight body controller 14 (S101). The flight body controller 14 controls the movement of the flight body 10 on the basis of the position and posture information of the object P generated by the recognition device 12. The operator may visually check the object P and may input the position and posture information of the object P.

The flight body 10 moves to the target position and then approaches the object P (S102). Accordingly, the sucker pad 26 of the holding device 20 approaches the object P. Next, the controller 60 determines whether or not the sucker pad 26 is sufficiently in proximity to the object P (S103). Specifically, the controller 60 determines whether or not the distance to the object P has become equal to or less than the distance threshold on the basis of the sensor signal from the image sensor 36. In a case where it is determined that the sucker pad 26 is not sufficiently in proximity to the object P (S103: NO), the process returns to S102, and the controller 60 instructs the flight body 10 to approach the object P further.

In a case where the controller 60 determines that the sucker pad 26 is sufficiently in proximity to the object P (S103: YES), the controller 60 drives the suction device 28 (S104). Then, the controller 60 instructs the flight body 10 to approach the object P further (S105). Then, the controller 60 determines whether or not the degree of vacuum in the sucker pad 26 has reached a target pressure value (S106). In a case where it is determined that the degree of vacuum of the sucker pad 26 has reached the target pressure value (S106: YES), the flight body 10 starts conveying the object P under the control of the flight body controller 14. In a case where it is determined that the degree of vacuum of the sucker pad 26 has not reached the target pressure value (S106: NO), the controller 60 instructs the flight body 10 to approach the object P further (S105).

The controller 60 may drive the suction device 28 only in a case where it is determined that the sucker pad 26 has come into contact with the object P. In this case, in a case where it is determined that the pressure inside the sucker pad 26 detected by the pressure sensor 30 has not reached the target pressure value, the flight body controller 14 instructs the flight body 10 to rise away from the object P and to correct the position. Thereafter, the flight body controller 14 instructs the flight body 10 to approach the object P again.

Figure 12:
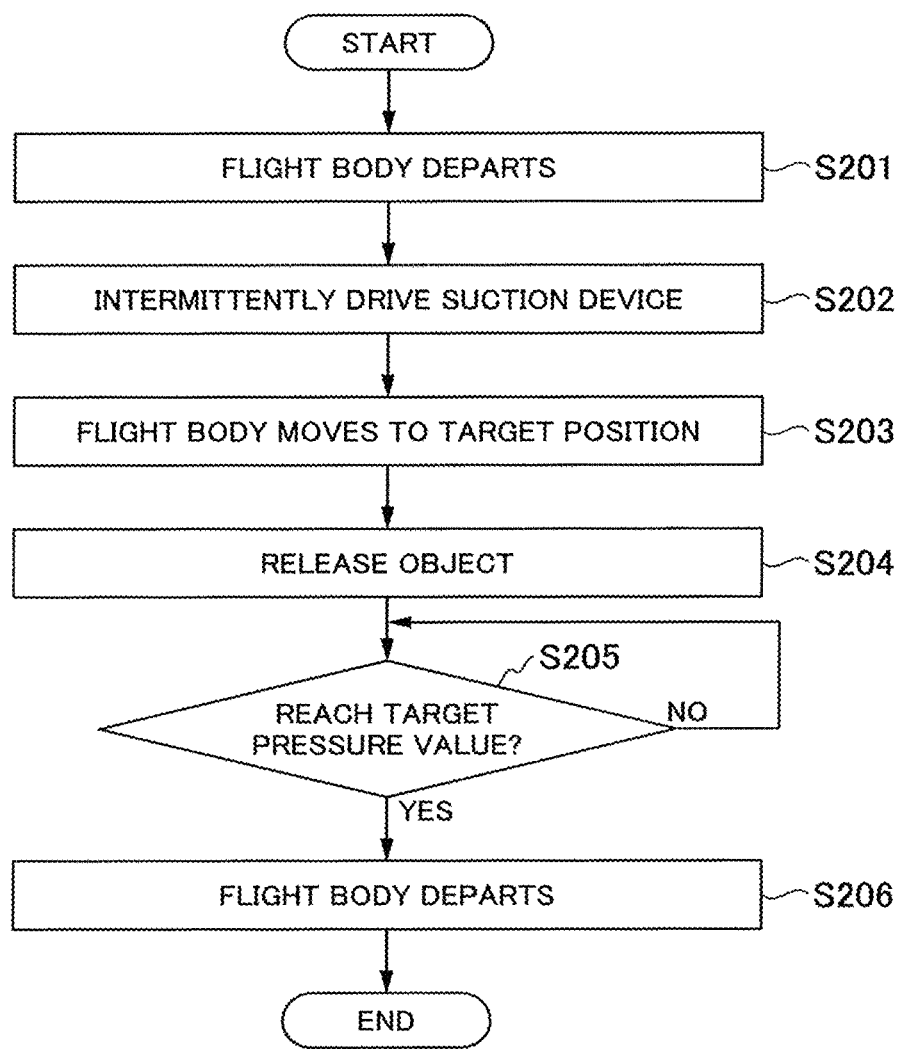
FIG. 12 is a flowchart showing an operation flow from transporting the object to releasing the object by means of the flight body according to the first embodiment.

FIG. 12 shows an operation flow from the conveying of the object P to the release thereof by the flight body 10. Under the control of the flight body controller 14, the flight body 10 departs from the loading table B in a state in which the object P is held by the sucker pad 26 (S201). While the flight body 10 is moving in the state in which the object P is held, the controller 60 intermittently drives the suction device 28 (S202). Therefore, the pressure inside the sucker pad 26 is kept below the target pressure value. Thereafter, the flight body 10 moves to the target position (S203), and then the releasing operation of the object P is performed (S204). For example, the controller 60 stops the suction device 28 and opens the switching valve 32. Next, the controller 60 determines whether or not the pressure inside the sucker pad 26 has reached the target pressure value on the basis of the sensor signal from the pressure sensor 30 (S205). In a case where it is determined that the pressure inside the sucker pad 26 has not reached the target pressure value (S205: NO), the flight body controller 14 does not move the flight body 10 until the pressure inside the sucker pad 26 reaches the target pressure value. In a case where it is confirmed that the degree of vacuum in the sucker pad 26 has decreased to the target pressure value (that is, the pressure inside the sucker pad 26 has reached the target pressure value or more) (S205: YES), the flight body controller 14 moves the flight body 10 (S206). In order to further improve the reliability of the releasing operation, whether or not the object P has been released may be determined on the basis of the sensor signal from the image sensor 36 in addition to the sensor signal from the pressure sensor 30. For example, in a case where the brightness of the image acquired by the image sensor 36 exceeds a certain value, the controller 60 can determine that the object P has been released from the sucker pad 26.

Next, an application example of the image sensor 36 will be described with reference to FIGS. 13 to 16.

Figure 13:
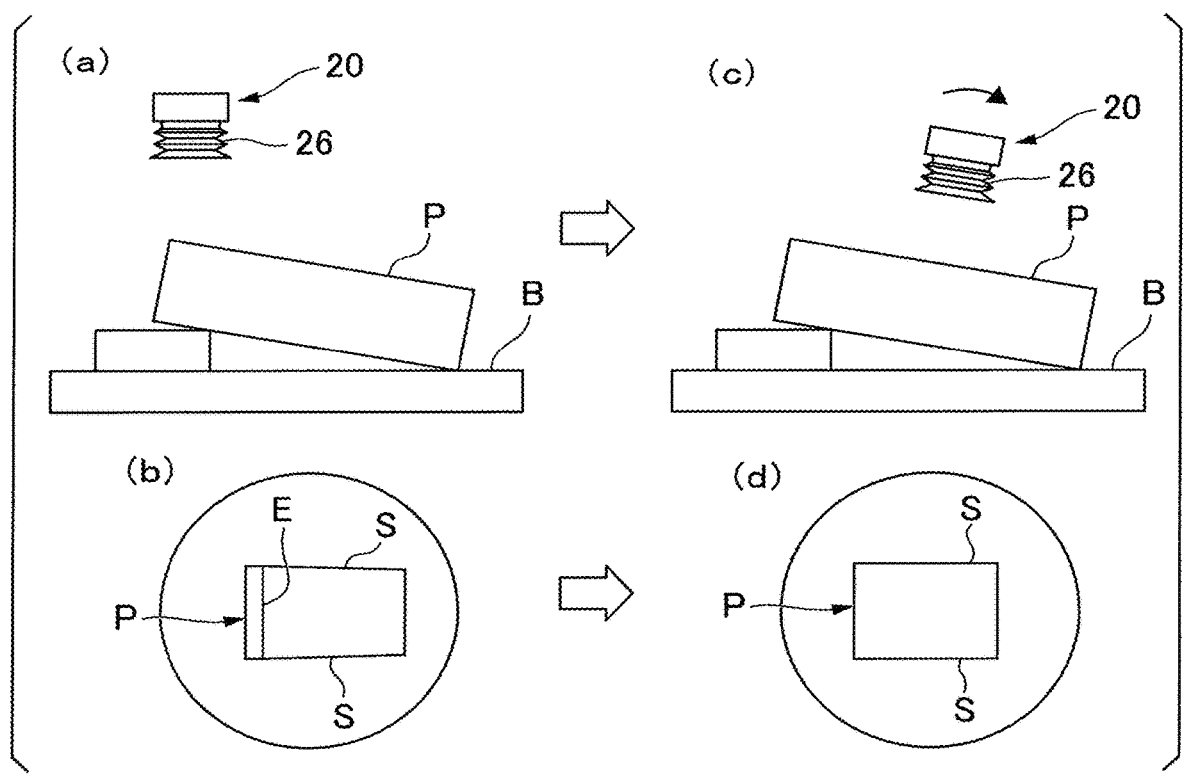
FIG. 13 is a view showing a first example of the image sensor according to the first embodiment.

FIG. 13 shows an application example of the image sensor 36. (a) in FIG. 13 shows a state in which the sucker pad 26 is about to adhere to the object P placed on the loading table B from the upper side in a state in which the lengthwise direction X of the holding device 20 substantially coincides with the vertical direction. (b) in FIG. 13 shows a schematic diagram of an image acquired by the image sensor 36 in the state of (a) in FIG. 13. (c) in FIG. 13 shows a state in which the sucker pad 26 is about to adhere to the object P placed on the loading table B from the upper side while the sucker pad 26 is tilted so that an adhering surface of the holding device 20 is substantially parallel to a surface of the object P to be adhered to. (d) in FIG. 13 shows a schematic view of the image acquired by the image sensor 36 in the state of (e) in FIG. 13.

In FIG. 13, the object P is inclined with respect to the loading table B. In this way, in a case where there is a difference between the position and posture of the adhering surface of the sucker pad 26 and the position and posture of the surface of the object P to be adhered to, the flight body controller 14 can instruct the flight body 10 to approach the object P while correcting the position and posture of the sucker pad 26 according to the position and posture of the object P, such that the adhering surface of the sucker pad 26 comes into contact with the surface of the object P to be adhered to without any gap. Specifically, in a state in which the lengthwise direction X of the holding device 20 substantially coincides with the vertical direction, as shown in (a) in FIG. 13, the image acquired by the image sensor 36 includes an edge E of the object P as shown in (b) in FIG. 13. In this case, the controller 60 can determine that the surface of the object P to be adhered to is tilted with respect to the adhering surface of the sucker pad 26. As shown in (c) and (d) in FIG. 13, the flight body controller 14 can instruct the flight body 10 to tilt the sucker pad 26 with respect to the vertical direction until such an edge E cannot be seen from the image sensor 36. The adhering surface of the sucker pad 26 tilted in this way can be substantially parallel to the surface of the object P to be adhered to. Here, the tilting operation of the sucker pad 26 may be performed by tilting the flight body 10 itself or by a rotation mechanism formed to rotate the sucker pad 26 with respect to the flight body 10. In a case where two long sides S and S of the object P, instead of the edge E of the object P, are not substantially parallel to each other in the image acquired by the image sensor 36, the controller 60 may determine that the surface of the object P to be adhered to is tilted with respect to the adhering surface of the sucker pad 26. Alternatively, it may be determined whether or not the surface of the object P to be adhered to is tilted with respect to the adhering surface of the sucker pad 26 by performing focusing on a plurality of portions of the surface of the object P to be adhered to in a state in which a depth of field of the image sensor 36 is narrow. Moreover, such determination may be made on the basis of the feature on the surface of the object P. Further, in the transport system 1, outer shape information of the object P to be transferred is obtained by image recognition processing or the like using the external image sensor 12a or the like of the recognition device 12, the above-described determination may be made on the basis of the outer shape information in addition to the image acquired by the image sensor 36.

Figure 14:
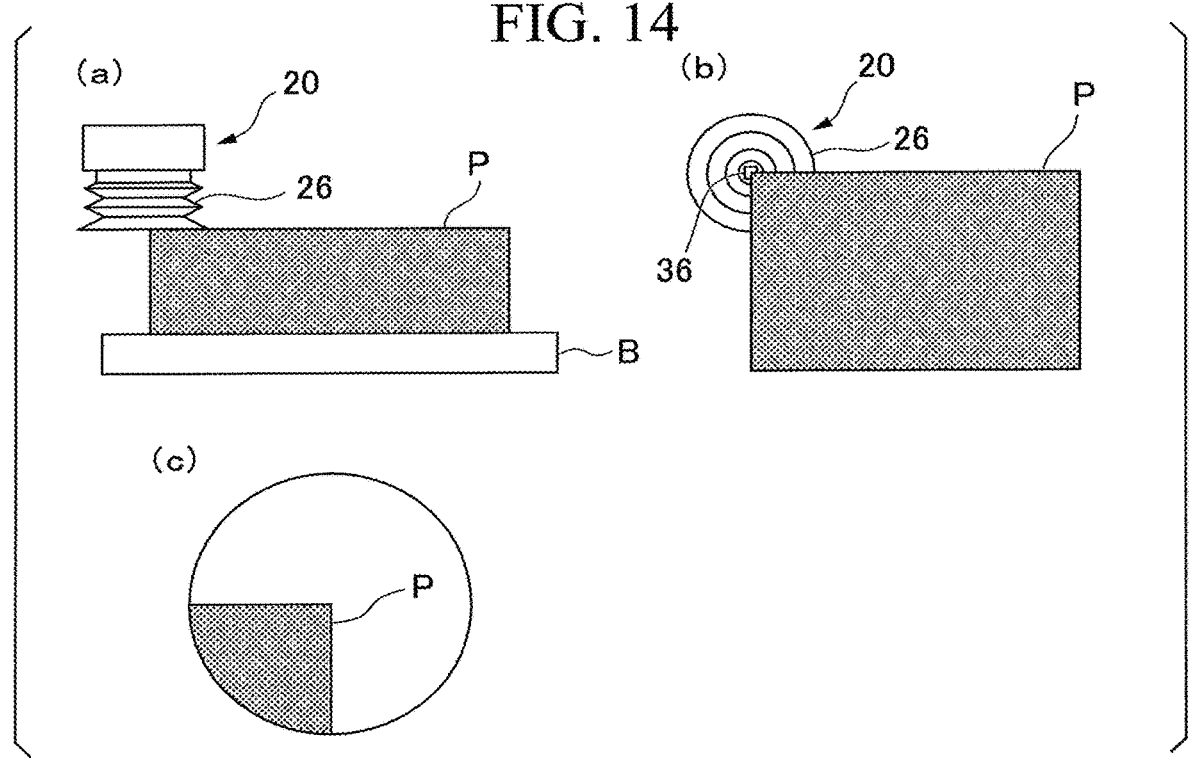
FIG. 14 is a view showing a second example of the image sensor according to the first embodiment.

FIG. 14 shows an application example of the image sensor 36. (a) in FIG. 14 is a side view of the sucker pad 26 which performs the adhesion on the corner of the object P. (b) in FIG. 14 is a bottom view of the sucker pad 26 and the object P in the state of (a) in FIG. 14. (c) in FIG. 14 shows a schematic view of the image acquired by the image sensor 36 in the state of (a) in FIG. 14.

As shown in (a) and (b) in FIG. 14, an upper surface of the object P is sufficiently wider than the adhering surface of the sucker pad 26. Therefore, in a case where the holding device 20 holds the object P at an appropriate position, the image of the image sensor 36 should be occupied by the object P. However, as shown in (a) and (b) in FIG. 14, in a state in which only a part of the sucker pad 26 is in contact with the object P and the rest of the sucker pad 26 floats in the air, the image of the image sensor 36 cannot be occupied by the object P (refer to (c) in FIG. 14). The controller 60 can determine that the holding device 20 does not hold the object P at an appropriate position in a case where the amount of light received by the light detecting element of the image sensor 36 is equal to or larger than the predetermined light amount threshold. In this case, the flight body controller 14 instructs the flight body 10 to retry the holding operation. Further, in a case where there is a difference between the object P detected by the image sensor 36 during the holding of the object P and the object P to be transferred detected in advance by the image recognition processing or the like of the external image sensor 12a of the recognition device 12 or the like, the controller 60 can determine that the holding device 20 holds a wrong object (that is, an object different from the object P to be transferred). For example, in a case where the recognition device 12 previously recognizes that the object P to be transferred is an elongated object, in a case where the image from the image sensor 36 is not the elongated object but an object occupying the entire image is photographed, the controller 60 can determine that there is a possibility that the holding device 20 erroneously holds another object.

Figure 15:
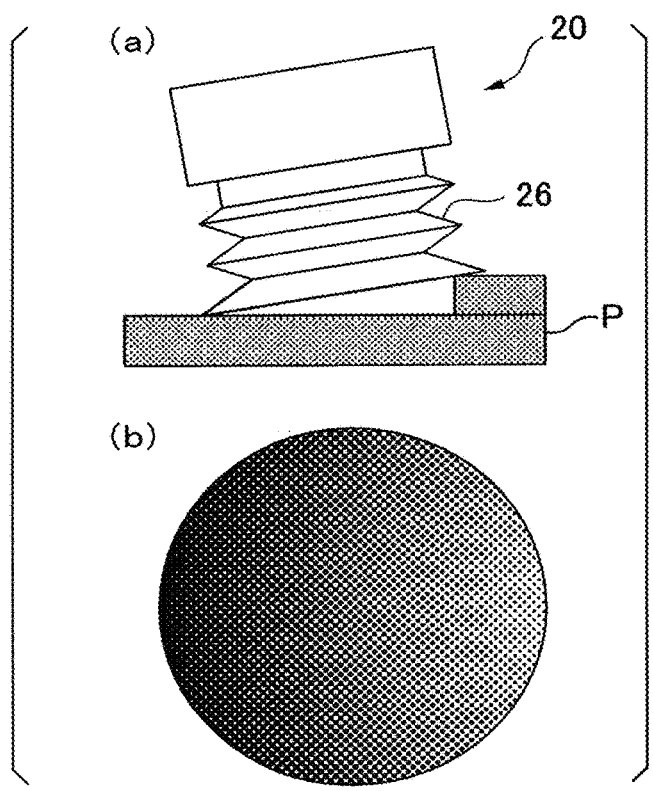
FIG. 15 is a view showing a third example of the image sensor of the first embodiment.

FIG. 15 shows an application example of the image sensor 36. (a) in FIG. 15 is a side view of the sucker pad 26 which performs the adhesion with respect to the object P having a convex. (b) in FIG. 15 shows a schematic view of an image acquired by the image sensor 36 in the state of (a) in FIG. 15.

As shown in (a) in FIG. 15, since the convex is formed on the upper surface of the object P, a gap is formed between the adhering surface of the sucker pad 26 and the surface of the object P to be adhered to. In such a case, since air flows from the gap into the inside of the sucker pad 26 and the degree of vacuum inside the sucker pad 26 does not increase, an adhesion force tends to decrease. As shown in (b) in FIG. 15, as external light (for example, light from the lighting device 42 or natural light) enters the inside of the sucker pad 26 from the gap, a light amount distribution (also, referred to as light intensity distribution) is biased in the image acquired by the image sensor 36. Here, the "light amount distribution" means a distribution indicating a magnitude of the light amount of each pixel in the image. The "biasing of the light amount distribution" means that the light amount distribution is non-uniform, for example, a case where the light amount distribution is asymmetric with respect to the center of the image or a straight line passing through the center. In a case where the biasing of the light amount distribution is within a predetermined range, the controller 60 can determine that there is no gap between the adhering surface of the sucker pad 26 and the surface of the object P to be adhered to and can move the suction device 28. On the other hand, in a case where the biasing of the light amount distribution exceeds the predetermined range, the controller 60 can determine that there is a gap between the adhering surface of the sucker pad 26 and the surface of the object P to be adhered to. In this case, the flight body controller 14 instructs the flight body 10 to rise away from the object P and to correct the position. Thereafter, the flight body controller 14 instructs the flight body 10 to approach the object P again and to perform the adhesion at a place in which no gap is generated.

Figure 16:
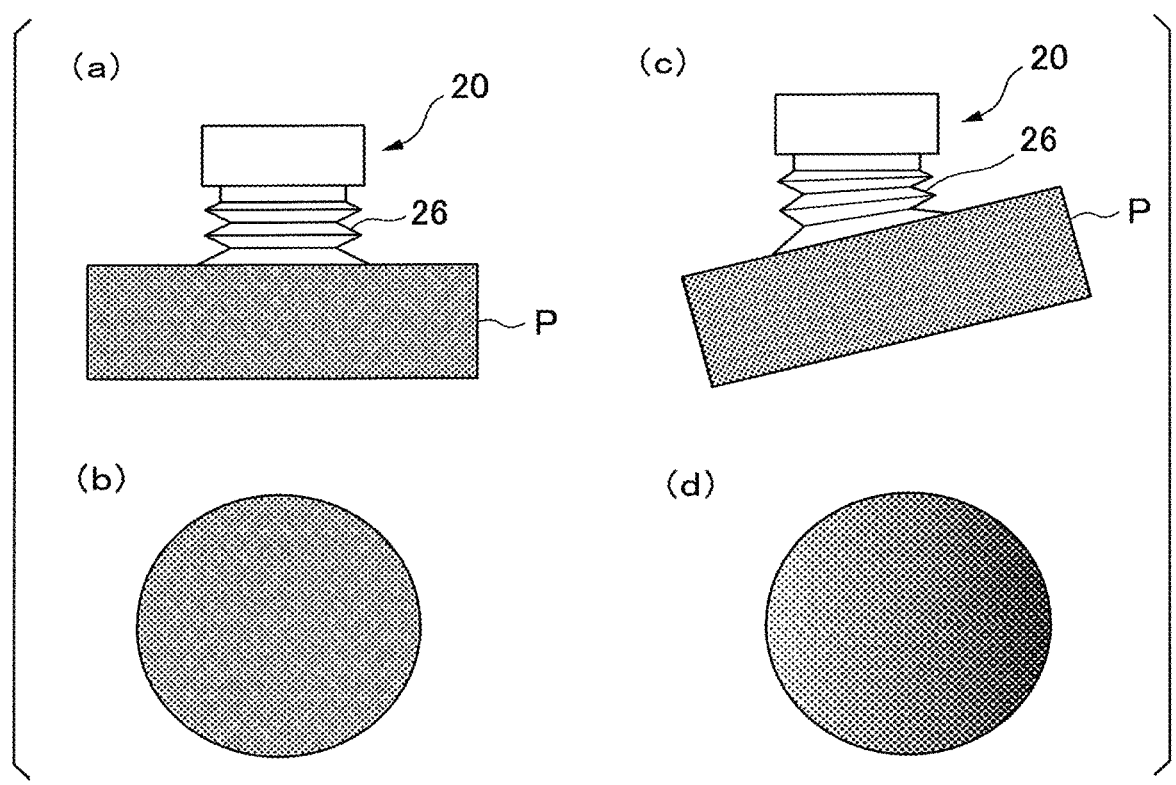
FIG. 16 is a view showing a fourth example of the image sensor of the first embodiment.

FIG. 16 shows an application example of the image sensor 36. (a) in FIG. 16 is a side view of the sucker pad 26 which performs the adhesion on the object P in a state in which the center of gravity of the object P is located in the vicinity of the sucker pad 26. (b) in FIG. 16 shows a schematic view of the image acquired by the image sensor 36 in the state of (a) in FIG. 16. (c) in FIG. 16 is a side view of the sucker pad 26 which performs the adhesion on the object P in a state in which the center of gravity of the object P is largely displaced from the position of the sucker pad 26. (d) in FIG. 16 shows a schematic view of the image acquired by the image sensor 36 in the state of (c) in FIG. 16.

In (a) in FIG. 16, the object P is held substantially horizontally by the holding device 20. On the other hand, in (b) in FIG. 16, the object P is held by the holding device 20 in a state of being inclined with respect to the horizontal plane.

With the bellows-shaped sucker pad 26, the sucker pad 26 contracts while holding the object P. In a case where a material of the sucker pad 26 is a transparent material such as a silicon material, the inside of the sucker pad 26 at the time of adhesion is kept at a constant brightness. In a case where the object P is tilted with respect to the horizontal plane as shown in (b) in FIG. 16, a dense portion and a sparse portion may be generated in the bellows shape of the sucker pad 26. In this case, since more external light enters the inside of the sucker pad 26 from the sparse portion than in a portion in which the bellows shape is dense, the biasing of the light amount distribution may occur in the image acquired by the image sensor 36. Therefore, in a case where the light amount distribution is biased in the image acquired by the image sensor 36 in a state in which the object P is held and lifted, the controller 60 can determine that the held object P is tilted with respect to the horizontal plane. Further, the controller 60 can calculate a degree of inclination of the object P on the basis of the amount of light detected by the image sensor 36. In this case, in order to avoid a situation in which the tilted object P comes into contact with the external environment and is damaged, the flight body controller 14 instructs the flight body 10 to be temporarily away from the object P, to correct the position and then to adhere to the object P again. In a case where the adhesion position is changed, the flight body controller 14 instructs the flight body 10 so that the sucker pad 26 moves in a direction in which the bellows shape is sparse, that is, in a direction in which the light amount distribution is bright (a side close to the center of gravity of the object P). As the holding operation of the object P is performed again on the basis of the calculated light amount distribution, the holding device 20 can stably hold the object P. A pattern (for example, a vertical line, a grid line, or the like) may be applied to the sucker pad 26 to more easily detect a change in the amount of light. The external light may be illumination light by the lighting device 42 or may be natural light.

According to the constitution of the first embodiment as described above, the reliability of the adhering and holding operation can be improved.

In the logistics industry, due to the expansion of an online shopping market, an amount of packages rapidly increases, while securing labor force is a challenge against a backdrop of the low birthrate and aging. Currently, large-scale logistics center construction is actively proceeding. Logistics companies introduce automated equipment for various tasks and are working on automating the distribution system.

A stationary manipulator is known as a device which performs transferring operations (also referred to as unloading, depalletizing, picking, and so on) for moving packages to another place. In such a manipulator, a working range is limited. In addition, although mobile manipulator equipment combining a moving cart and a manipulator is also assumed, the working range is limited as well, because it is necessary to overcome three-dimensional obstacles such as stairs in a case where it moves to a work place other than a planar area or it is necessary to take measures such as expanding of a passage width on the environment side to prevent contact with the surrounding environment in a case where it moves on the passage.

Under the circumstances as described above, it is expected to utilize a flight body (such as a drone) which can freely move in the air over a wide range. An object holding mechanism applicable to a flight body is required to realize a flight body carrying out the transfer work.

In the holding device 20 according to the embodiment, since the image sensor 36 can two-dimensionally detect the amount of light from the object P, the detection of the position and posture of the object P, the detection of falling of the object P, the detection of an appropriate adhesion area, and the detection of a state in which the object P is not adhered to are enabled. Further, as compared with a case where a sensor that one-dimensionally detects the amount of light is used, in a case where a light amount sensor which performs two-dimensional detection is used, information on the shape of the object P can also be acquired, and thus it is easy to determine the direction of subsequent position correction, for example, in a case where the adhesion fails. In addition, in the light amount sensor which performs one-dimensional detection, an erroneous determination may be performed in a case where the object P has a hole or a mesh structure, but it is possible to more accurately perform object recognition for such an object P by using the light amount sensor which performs two-dimensional detection.

Further, the holding device 20 according to the embodiment including the suction device 28 and the power supply unit 62 is componentized. Therefore, the holding device 20 can be easily attached to the flight body 10. Furthermore, the holding device 20 includes the image sensor 36 and autonomously starts the adhering operation immediately before the holding portion comes into contact with the object P on the basis of the sensor signal from the image sensor 36. Accordingly, energy saving can be realized. Also, it is possible to minimize unexpected dust clogging in the vacuum system and to improve durability. Since the holding device 20 according to the embodiment is componentized, it is not limited to the flight body, and it can be easily connected to a manipulator, a mobile cart, or the like and can be used.

Further, in a case where the holding device 20 including the image sensor 36 and so on is componentized into an integrated type, this leads to wiring savings of sensors and a length of tube piping is shortened, and thus it is possible to shorten a time of the adhering operation. The suction device 28 needs to suction the gas from the entire inside of the tube in addition to the inside of the sucker pad 26. In a case where the length of the tube piping is short, a volume which needs to be suctioned accordingly is small, and this leads to shortening of the time of the adhering operation.

In the transport system 1, distance information from the flight body 10 to the upper surface of the uppermost object P is obtained by the image recognition processing, and the flight body 10 is controlled to moves down on the basis of the distance information. However, in a case where there is an erroneous detection in the distance information, particularly, in a case where a distance larger than an actual distance is detected, the holding device 20 (more specifically, the sucker pad 26) of the flight body 10 pushes the object P, and thus the object P may be damaged or deformed.

Therefore, as the image sensor 36 having the above-described constitution is disposed on the image sensor board 34 inside the sucker pad 26, it is possible to stop descent of the flight body 10 before the sucker pad 26 comes into contact with the object P. It is also possible to estimate an amount of descent of the flight body 10 from an amount of change in a ratio of the area of the object P occupying the image detected by the image sensor 36. Thus, the damage or deformation of the object P due to excessive pushing of the holding device 20 can be prevented.

Further, since such pushing is performed uniformly over the entire sucker pad 26 of the holding device 20, it suffices to use at least one image sensor 36 disposed on the image sensor board 34. Therefore, it is possible to prevent the pushing with the minimum necessary number of sensors by disposing at least one image sensor 36 at the center of the image sensor board 34.

In the embodiment, the image sensor 36 is disposed on the image sensor board 34. Therefore, in a case where the image recognition by the recognition device 12 fails, it is possible to hold and lift the object P by the sucker pad 26 and to recognize the adhesion state and the inclination of the object P on the basis of the detection result of the image sensor 36 in the lifted state. As a result, it is possible to set an appropriate holding manner by the sucker pad 26 on the basis of the adhesion information and inclination of the recognized object P, and the object P can be held again in the set manner. In this way, even in a case where the object P to be transferred is misrecognized, it is possible to continue the transfer work without causing the object P to fall or stopping of the operation due to the error.

In the embodiment, the controller 60 controls the suction device 28 to perform the suctioning in a case where the result of detection of the light amount distribution by the image sensor 36 satisfies a predetermined condition. According to such a constitution, since it is possible to determine success or failure of the adhesion on the basis of the light amount distribution, the reliability of the adhering and holding operation can be improved.

Further, in the embodiment, the image sensor 36 is disposed inside or behind the sucker pad 26. In addition, the sucker pad 26 has the cavity 26a, and the image sensor 36 is disposed at a position visible from the outside through the cavity 26a. According to such a constitution, since the image sensor 36 can perform photographing from the inside of the holding device 20, the holding device 20 can be miniaturized. As a result, the reliability of the adhering operation can be improved.

Further, in the embodiment, the controller 60 controls the suction device 28 to perform the suctioning in a case where it is detected that the object P is in proximity to the sucker pad 26 on the basis of the information acquired by the image sensor 36. According to such a constitution, it is possible to further save energy and to further save the battery of the power supply unit 62.

Further, in the embodiment, the controller 60 estimates the distance to the object P on the basis of the change in the size of at least one of the object P and the feature on the surface of the object P in the image acquired by the image sensor 36, and the controller 60 controls the suction device 28 to perform the suctioning in a case where the distance is equal to or smaller than the distance threshold. According to such a constitution, since the suction device 28 is driven only in a case where the sucker pad 26 approaches the object P, energy consumption of the power supply unit 62 can be minimized. This leads to an improvement in an operation time of the flight body 10.

Further, in the embodiment, the controller 60 sets the distance threshold to a first value in a case where a moving speed of the sucker pad 26 is a first speed and sets the distance threshold to a second value larger than the first value in a case where the moving speed of the sucker pad 26 is a second speed higher than the first speed. According to such a constitution, it is possible to further save energy and to further save the battery of the power supply unit 62.

Further, in the embodiment, the lighting device 42 for irradiating the sucker pad 26 with illumination light is further included, and the controller 60 controls the suction device 28 to perform the suctioning in a case where the result of detection of the light amount distribution acquired by the image sensor 36 in a state in which the lighting device 42 is emitting light satisfies a predetermined condition. According to such a constitution, it is possible to more reliably and easily determine the success or failure of the adhesion on the basis of the light amount distribution.

Further, in the embodiment, the image sensor 36 is disposed at the center of the sucker pad 26 in a plane substantially orthogonal to the direction in which the sucker pad 26 adheres to the object P. According to such a constitution, it is possible to more reliably and easily determine the success or failure of the adhesion on the basis of the light amount distribution.

Further, the holding device 20 according to the embodiment further includes the switching valve 32 which is switched between a first state in which the flow path between the suction device 28 and the sucker pad 26 is allowed to communicate with the atmospheric pressure space and a second state in which the communication between the flow path and the atmospheric pressure space is blocked, a drive device which drives the suction device 28 and the switching valve 32, and the pressure sensor 30 which detects the pressure of the gas inside the flow path. According to such a constitution, since it is possible to detect the pressure inside the sucker pad 26, it is possible to obtain more reliable information concerning the holding state, and so on in addition to the detection result by the image sensor 36. Further, at the time of conveyance of the object P, it is possible to switch the operation state of the suction device 28 on the basis of the degree of vacuum (pressure value) of the sucker pad 26. This also leads to suppression of energy consumption of the power supply unit 62.

Further, in the embodiment, the controller 60 stops the driving of the suction device 28 in a case where the pressure detected by the pressure sensor 30 is lower than a first pressure threshold and starts the driving of the suction device 28 in a case where the pressure detected by the pressure sensor 30 is higher than a second pressure threshold, and the second pressure threshold is approximately equal to or higher than the first pressure threshold. According to such a constitution, it is possible to further save energy and to further save the battery of the power supply unit 62.

Further, the holding device 20 according to the embodiment further includes the support member 24 which supports the sucker pad 26, the support member 24 has the air hole 24b which communicates with the sucker pad 26 and the suction device 28, and the image sensor 36 is disposed to be spaced from the air hole 24b of the support member 24 toward the suction device 28. According to such a constitution, the image sensor 36 and the image sensor board 34 do not block the flow path between the sucker pad 26 and the suction device 28, and thus the suction of air by the suction device 28 can be performed smoothly.

Further, in the embodiment, the image sensor 36 is supported by the elastic member 44 with respect to the support member 24. According to such a constitution, it is possible to impart vibration damping characteristics to the image sensor 36 against the vibration of the flight body 10 or the holding device 20.

Second Embodiment

Next, a second embodiment will be described with reference to FIG. 17. The second embodiment is different from the first embodiment in that a proximity sensor 90 is provided. The constitutions other than those described below are the same as those in the first embodiment.

Figure 17:
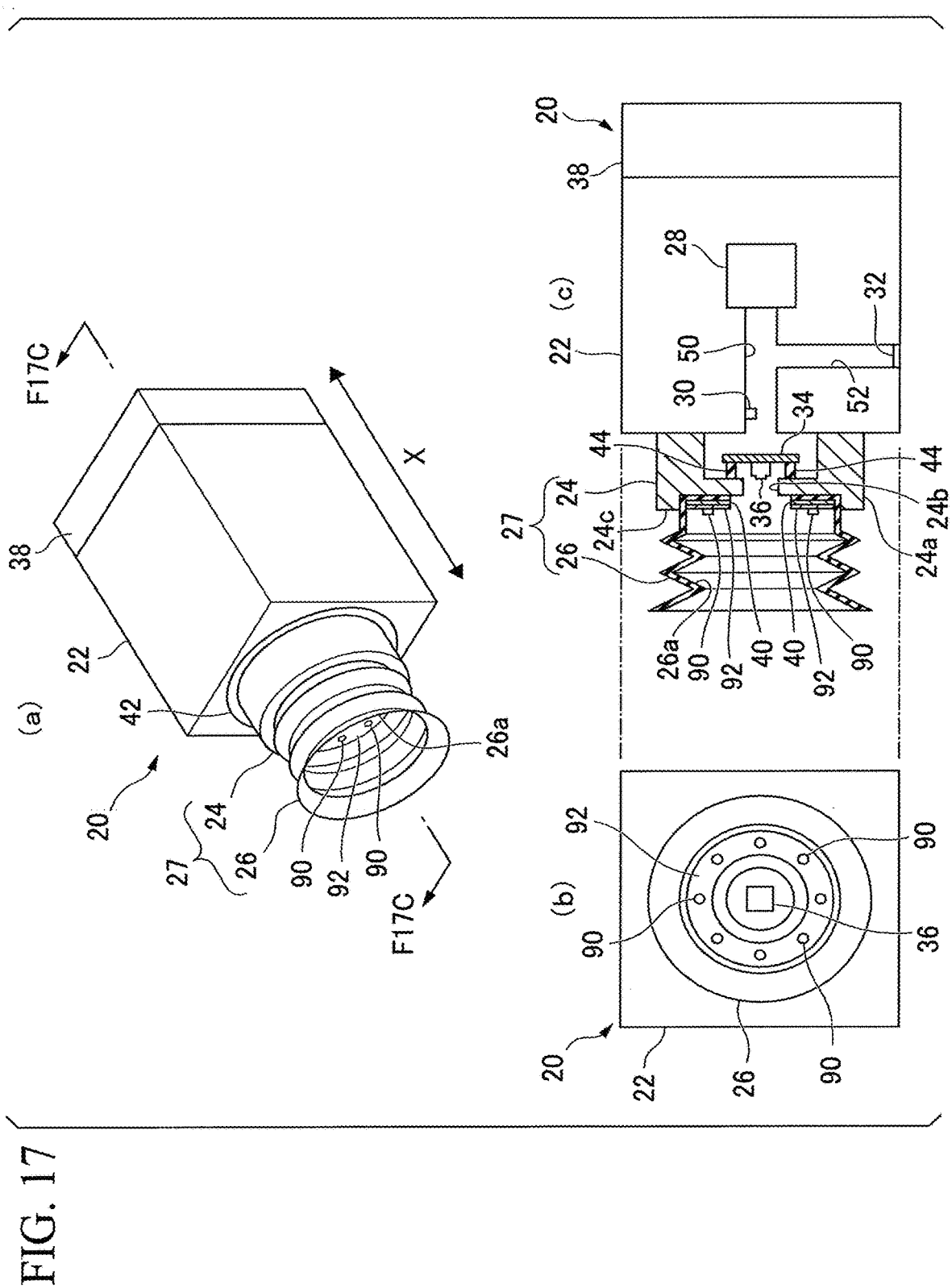
FIG. 17 is a view showing a holding device according to a second embodiment.

FIG. 17 is a view showing a holding device 20 according to a second embodiment. (c) in FIG. 17 shows a cross section taken along line F17C-F17C of the holding device 20 shown in (a) in FIG. 17. As shown in FIG. 17, the proximity sensor 90 is disposed inside the sucker pad 26. In other words, the proximity sensor 90 is located inside an enclosed space which is formed by the housing 22, the support member 24, the sucker pad 26, and the object P. The proximity sensor 90 is mounted on a proximity sensor board 92 and is fixed to the housing 22 via the proximity sensor board 92. The proximity sensor board 92 is, for example, a ring-shaped member. Eight proximity sensors 90 are disposed at intervals of 45 degrees on a circle concentric with the support member 24 and the sucker pad 26. The proximity sensor 90 may be one, two to seven, or nine or more. For example, in a case where the proximity sensor 90 is a photoelectric type sensor, the proximity sensor 90 is disposed so that light emitted by the proximity sensor 90 substantially perpendicularly intersects a plane including the adhering surface of the sucker pad 26. The arrangement of the proximity sensor 90 is not limited to the example shown in FIG. 17 and can take various forms.

The proximity sensor 90 is mounted on a main surface (also, referred to as a detection surface) of the proximity sensor board 92. The proximity sensor board 92 is provided on the sucker pad fixing member 40. The proximity sensor board 92 has a ring shape. The proximity sensor 90 detects that the object P is in proximity to the proximity sensor 90. The adhering surface of the sucker pad 26 and the proximity sensor 90 are located on the main surface side of the proximity sensor board 92, and the approach of the object P to the proximity sensor 90 can be regarded as the approach of the object P to the sucker pad 26.

The proximity sensor 90 and the proximity sensor board 92 may be disposed behind the sucker pad 26. For example, the proximity sensor 90 may be provided adjacent to the image sensor 36. In this case, the proximity sensor board 92 may be omitted, and the image sensor board 34 may also serve as the board for the proximity sensor 90.

As the proximity sensor 90, for example, a distance sensor can be used. The distance sensor measures the distance to the object in a non-contact manner. Examples of the distance sensor include an active optical distance measuring sensor, a reflection type photosensor, an optical TOF (Time-Of-Flight) type optical distance measuring sensor, and so on. Here, the "active type sensor" is a sensor which actively acts on an object (for example, irradiating an object with light).

The active optical distance measuring sensor outputs a signal corresponding to the distance to an object by irradiating light from a light source such as an LED to the object and detecting reflected light from the object by a light detecting element. A position sensitive detector (PSD) is an example of the active optical distance measuring sensor. The PSD is an optical distance measuring sensor of optical triangulation measurement type which can easily measure the distance to the object.

The reflection type photosensor includes an LED and a photodiode. The LED emits detection light having a predetermined light amount on the basis on a drive signal supplied from an analog circuit. In a case where the object is located in the vicinity of the reflection type photosensor, the detection light is reflected by the object. The reflected light from the object is detected by the photodiode. The photodiode generates a detection current corresponding to an amount of received light (light intensity of reflected light). Since the intensity of the reflected light increases as a distance between the object P and the photodiode decreases, a detection signal indicating the distance to the object can be obtained. The analog circuit controls the light amount of the detection light of the LED to be constant, generates a detection signal corresponding to the detection current obtained from the photodiode and supplies the detection signal to the controller 60. The controller 60 can calculate the distance to the object P on the basis of the received detection signal.

The optical TOF type optical distance measuring sensor measures the distance by measuring a time until the reflected light returns. In the TOF method, pulse light is emitted from a light source to an object, and the pulse light reflected from the object is detected by the light detecting element, and a time difference between a emission timing of the pulse light and a detection timing is measured. Since this time difference ($\Delta t$) is a time required for the pulse light to fly at the light velocity ($=c$) with a distance ($2\times d$) twice the distance d to the object, $d=(c\times\Delta t)/2$ is established. The time difference ($\Delta t$) can be expressed as a phase difference between an output pulse from the light source and a detection pulse. In a case where this phase difference is detected, the distance d to the object can be obtained. The TOF method makes it possible to measure the distance more precisely than the method of measuring the distance by the intensity of reflected light. Furthermore, it is resistant to an influence on a surface condition of the object, and stable measurement can be performed.

In addition, as the proximity sensor 90, a sensor for determining the presence or absence of an object may be used. An example of this sensor is a reflection type photoelectric sensor. This photoelectric sensor includes a light source and a light detecting element. In the photoelectric sensor, light such as infrared rays is emitted from the light source to the object, and the reflected light of which the light amount is reduced by the light reflected by the object is received by the light detecting element. The photoelectric sensor detects the presence of an object within a certain distance from the photoelectric sensor in a case where the light amount received by the light detecting element is equal to or more than a predetermined light amount threshold. Additionally, in a case where the object is moved outside the range of a certain distance from the photoelectric sensor, the attenuation of the light amount of the reflected light from the object becomes large, and the light amount received by the light detecting element becomes less than the predetermined light amount threshold, and the photoelectric sensor detects that the object is not present within a certain distance. For example, the photoelectric sensor outputs a detection signal while the object is present within a certain distance and does not output the detection signal in a case where the object is not present within the certain distance.

The proximity sensor 90 is not limited to the photoelectric sensor and may be a sensor of another type such as a capacitance type or an ultrasonic type.

The proximity sensor 90 may be used as a load sensor which detects the presence of the object P adhered to by the sucker pad 26. The proximity sensor 90 can measure a distance in a range from the end of the sucker pad 26 to a position separated by a predetermined distance. Additionally, the proximity sensor 90 detects whether or not the object P is present within a range of a certain distance from the main surface of the proximity sensor board 92. It is possible to recognize the outer shape information (that is, the size and shape) of the object P held by the sucker pad 26 on the basis of the distance information from the proximity sensor 90 by disposing such a proximity sensor 90 in an in-plane direction of the proximity sensor board 92 in a dispersed manner.

Further, while the object P is held by the sucker pad 26, the proximity sensor 90 located in a region corresponding to the outer shape of the object P detects the presence of the object P (that is, the measured distance is a short distance). Therefore, in a case where it is detected that the object P is not present by all the proximity sensors 90 (that is, the measured distance is a long distance) while the holding of the object P is performed, it can be regarded that the object P has fallen. In this way, it is also possible to detect the falling of the object P.

In the transport system 1, the outer shape information of the object P to be transferred is acquired by the image recognition processing or the like, the flight body controller 14 can predict the detection result of the proximity sensor 90 (for example, which proximity sensor 90 among the eight proximity sensors 90 detects the presence of the object P (that is, whether or not the measured distance is a short distance)) on the basis of the outer shape information. For example, as shown in FIG. 14, it is assumed that the object P placed on the loading table B is held. Here, as shown in FIG. 14, the upper surface of the object P is sufficiently wider than the adhering surface of the sucker pad 26. Therefore, in a case where the holding device 20 holds the object P at an appropriate position, the object P should be detected by all the proximity sensors 90. However, in the state shown in FIG. 14, the object P is not detected by three quarters of the proximity sensor 90. In a case where at least a part of the plurality of proximity sensors 90 does not detect the presence of the object P, the controller 60 can determine that the holding device 20 does not hold the object P at an appropriate position. Also, in a case where there is a difference between the actual detection result by the proximity sensor 90 during the holding of the object P and the prediction of the detection result of the proximity sensor 90 by the flight body controller 14, the controller 60 can determine that the holding device 20 holds a wrong object (that is, an object different from the object P to be transferred). For example, in a case where the recognition device 12 previously recognizes that the object P to be transferred is an elongated object, in a case where all the proximity sensors 90 as well as a pair of opposed proximity sensors 90 corresponding to the elongated object detect the presence of the object, the controller 60 determines that there is a possibility that the holding device 20 erroneously holds another object.

With the bellows-shaped sucker pad 26, in a case where the object P is held, the sucker pad 26 contracts. Accordingly, it is possible to determine that the sucker pad 26 has successfully adhered to the object P in a case where the flight body 10 descends and the proximity sensor 90 and the upper surface of the object P are closer than a predetermined distance.

In the transport system 1, distance information from the flight body 10 to the upper surface of the uppermost object P is acquired by the image recognition processing, and the flight body controller 14 controls the flight body 10 to descend on the basis of the distance information. However, in a case where there is an erroneous detection in the distance information, particularly in a case where a distance larger than an actual distance is detected, the holding device 20 (specifically, the sucker pad 26) of the flight body 10 pushes the object P, and thus the damage or deformation of the object P may be caused.

Therefore, as the proximity sensor 90 having the above-described constitution is provided on the proximity sensor board 92 inside the sucker pad 26, it is possible to stop descent of the flight body 10 before the proximity sensor board 92 approaches the object P. Thus, the damage or deformation of the object P due to excessive pushing of the holding device 20 can be prevented. Further, since such pushing is performed uniformly over the entire sucker pad 26 of the holding device 20, it suffices to use at least one proximity sensor 90 disposed on the proximity sensor board 92. Therefore, it is possible to prevent the pushing with the minimum necessary number of sensors by disposing at least one proximity sensor 90 along the contour of the proximity sensor board 92.

Further, the proximity sensor 90 can be used for checking an over-size of the object P to be adhered to by the sucker pad 26.

According to the constitution of the second embodiment as described above, the proximity sensor 90 makes it possible to detect falling of the object P, to detect an appropriate adhesion area and to prevent excessive pushing of the sucker pad 26. Further, in the constitution of the first embodiment, even in a case where detection failure or erroneous detection by the image sensor 36 occurs, the object P can be reliably detected by detecting the contact with the object P by the proximity sensor 90 in the constitution of the second embodiment. In particular, the proximity sensor 90 is useful in a case where it is difficult to detect the distance with only the image sensor 36, such as a case where the object P is transparent.

Further, in the embodiment, the proximity sensor 90 is disposed inside the sucker pad 26. With such a constitution, it is possible to downsize the holding device 20. As a result, the reliability of the adhering operation can be improved.

Third Embodiment

Next, a third embodiment will be described with reference to FIG. 18. The third embodiment is different from the second embodiment in that an acceleration sensor 94 is provided. The constitutions other than those described below are the same as those in the second embodiment.

Figure 18:
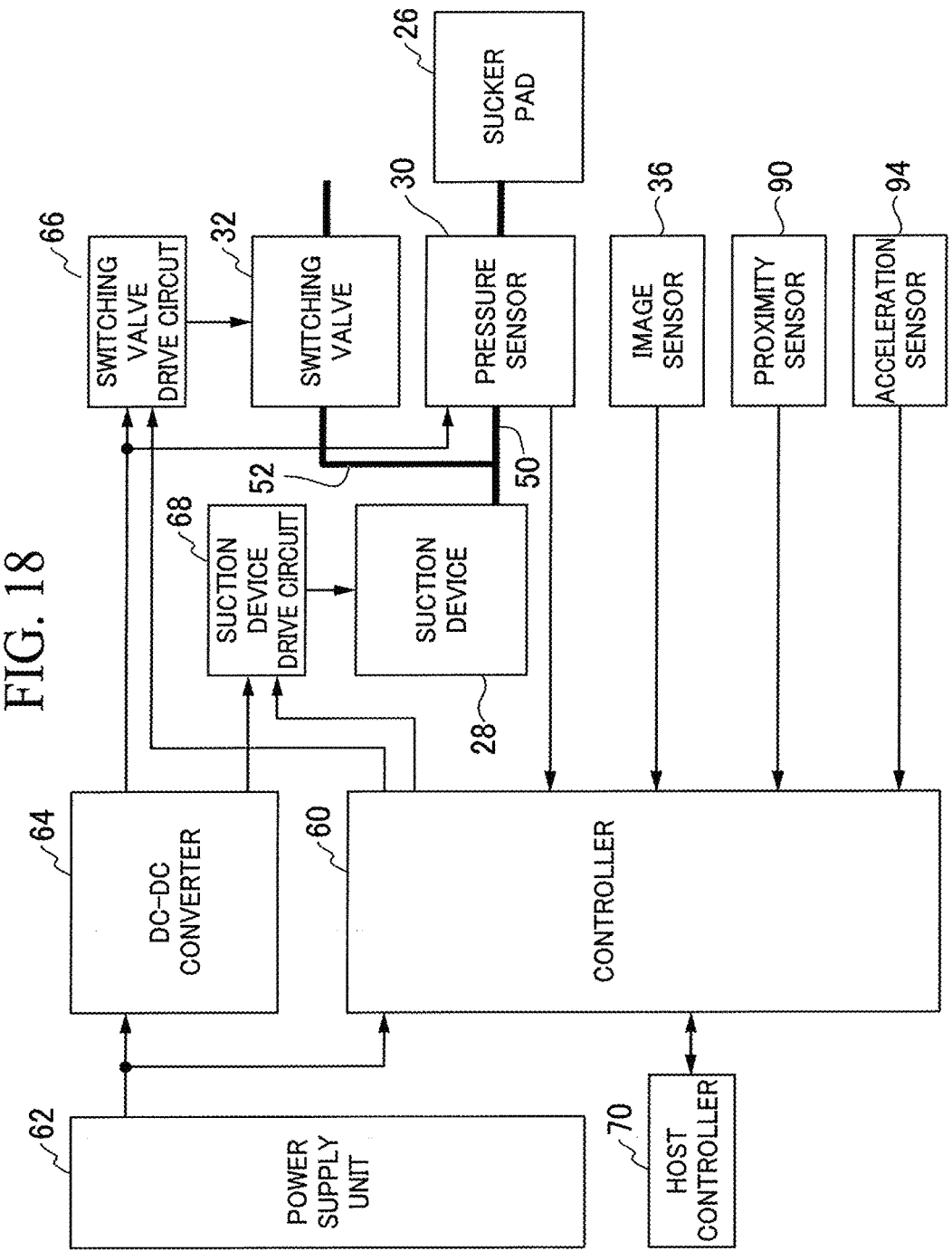
FIG. 18 is a block diagram showing a system constitution of a holding device according to a third embodiment.

As shown in FIG. 18, the holding device 20 according to the third embodiment has the acceleration sensor 94 in addition to the proximity sensor 90. The acceleration sensor 94 is connected to the controller 60. For example, the acceleration sensor 94 is accommodated inside the housing 22. The acceleration sensor 94 is an inertial sensor for the purpose of measuring acceleration. Unlike a vibration sensor, the acceleration sensor 94 can detect the acceleration of a direct current (DC), and thus it is also possible to detect the gravity. A variety of information such as inclination, motion, vibration, and shock can be obtained by performing appropriate signal processing on an acceleration signal indicating the acceleration measured by the acceleration sensor 94. Accordingly, since it is possible to monitor the moving speed and acceleration state of the flight body 10, it is possible to adjust a drive timing of the suction device 28 according to the moving speed of the flight body 10. More specifically, the drive timing of the suction device 28 is adjusted by changing the distance threshold related to the proximity sensor 90 or the image sensor 36 according to the acceleration state. For example, in a case where it is determined that the moving speed of the flight body 10 is high on the basis of the signal from the acceleration sensor 94, the controller 60 can drive the suction device 28 just before the object P comes in contact with the sucker pad 26 by setting the distance threshold for detecting the approach of the object P to a large value. Conversely, in a case where it is determined that the moving speed of the flight body 10 is small on the basis of the signal from the acceleration sensor 94, the controller 60 can drive the suction device 28 just before the object P comes into contact with the sucker pad 26 by setting the distance threshold to a small value.

According to the constitution of the third embodiment as described above, since the acceleration sensor 94 is provided in the holding device 20, the drive timing of the suction device 28 is adjusted according to the moving speed of the flight body 10, and thus it is possible to realize further energy saving, to minimize unexpected dust clogging to the vacuum system and to further improve durability.

Fourth Embodiment

Next, a fourth embodiment will be described with reference to (a) and (b) in FIG. 19. The fourth embodiment is different from the first embodiment in that an actuator 96 is provided. The constitutions other than those described below are the same as those in the first embodiment.

Figure 19:
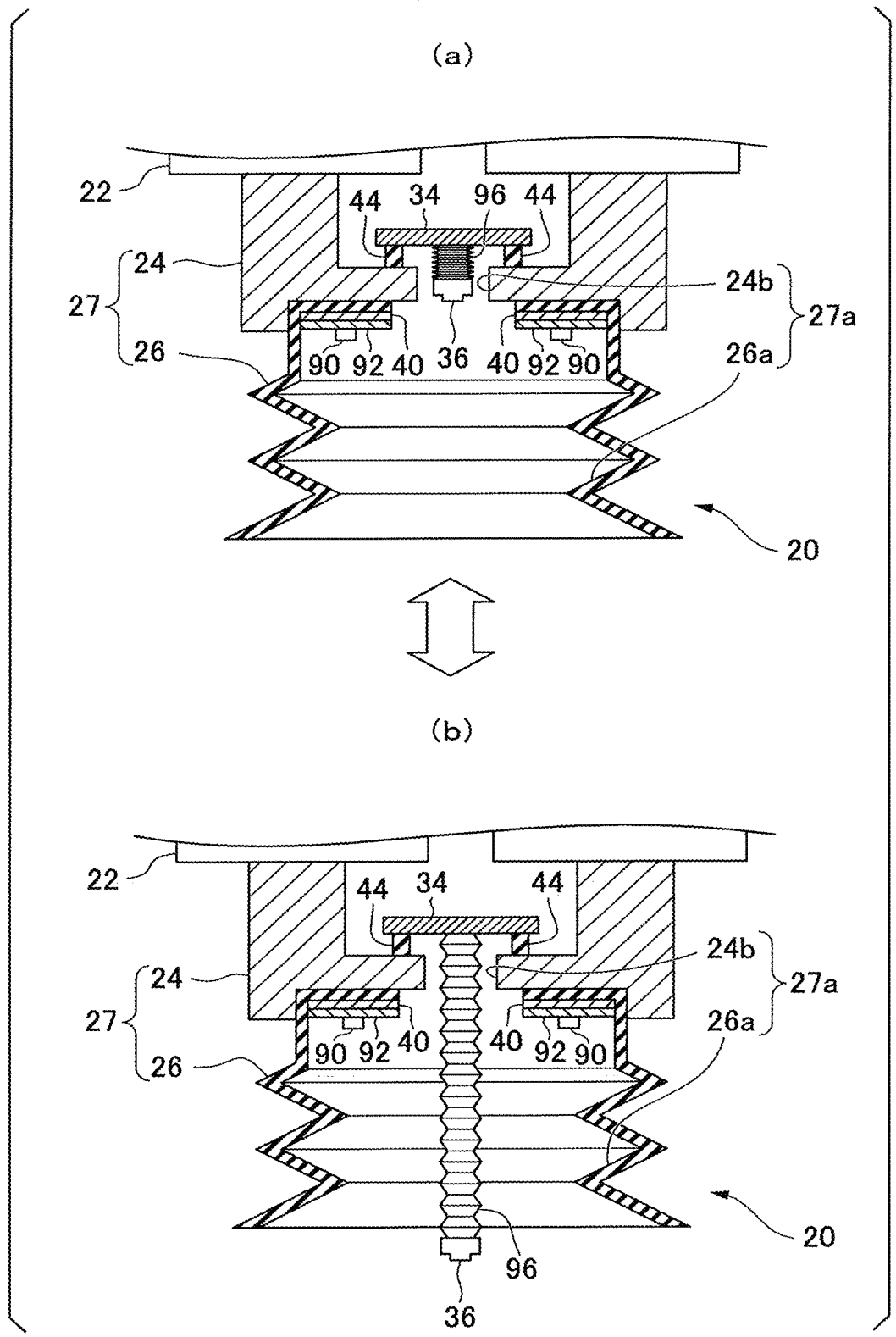
FIG. 19 is a cross-sectional view showing a holding device according to a fourth embodiment.

FIG. 19 shows a holding device 20 according to a fourth embodiment. (a) in FIG. 19 is a cross-sectional view showing the holding device 20 in a state in which the actuator 96 is not extended. (b) in FIG. 19 is a cross-sectional view showing the holding device 20 in a state in which the actuator 96 is extended.

As shown in FIG. 19, an actuator 96 is attached to the image sensor 36. The actuator 96 allows the image sensor 36 to protrude with respect to the adhering surface of the sucker pad 26 by linearly moving the image sensor 36 with respect to the support member 24, the sucker pad 26, or the like. That is, the actuator 96 can move the image sensor 36 through the hollow portion 27a between a first position in which the entire image sensor 36 is located in the hollow portion 27a and a second position in which at least a part of the image sensor 36 is located outside the hollow portion 27a. As the actuator 96, for example, a pneumatic or electric actuator can be used. The pneumatic actuator can change the position of the image sensor 36 by air flowing in and out of the bellows shape of FIG. 19. A cylinder type actuator or the like may be used as the pneumatic actuator. The pneumatic actuator may be operated by the suction device 28. In this case, for example, a valve mechanism (for example, a solenoid valve) for switching between a mode in which the suction device 28 performs the adhesion of the sucker pad 26 and a mode in which the suction device 28 operates the pneumatic actuator can be provided. In a case where the electric actuator is used, for example, the electric actuator can realize a linear motion by combining a motor and a feed screw.

According to the constitution of the fourth embodiment as described above, it is possible to use a fish-eye lens or a wide-angle lens as a lens of the image sensor 36. Therefore, it is possible to secure a wide field of view. Accordingly, since it is possible to obtain information on the outside of the sucker pad 26, it is possible to prevent collision between the sucker pad 26 and the surrounding environment while the flight body 10 is flying. In addition, in a case where an obstacle is present in a movement path during the movement (downward or lateral movement) of the holding device 20, it is also possible to detect the obstacle by the protruding image sensor 36 and to prevent a collision.

The flight body 10 is an example of a robot to which the holding device 20 can be applied. The holding device 20 according to each of the above-described embodiments can also be applied to a manipulator or a moving cart.

In each of the embodiments, it is assumed that the suction device 28 is driven in a case where the distance from the sucker pad 26 to the object P becomes less than the distance threshold. However, regardless of such a distance, the suction device 28 may be driven in a case where the ratio of the area of the object P to the entire image of the image sensor 36 becomes equal to or larger than a certain value.

Further, in each of the embodiments, it is assumed that the processing in the controller 60 is realized by program software in an external storage device such as a memory using one or more processors such as a central processing unit (CPU) but may be realized by hardware (for example, a circuit unit; circuitry) not using the CPU. Further, the processing may be performed via a cloud server.

The instructions indicated in the processing procedures shown in the respective embodiments can be executed on the basis of a program which is software. It is also possible to obtain the same effect as the effect of the above-described processing procedure by a general-purpose computer system storing this program in advance and reading this program. The instructions described in each of the embodiments are programs which can be executed by a computer and may be stored in a magnetic disk (a flexible disk, a hard disk, and so on), an optical disk (CD-ROM, CD-R, CD-RW, DVD-ROM, DVD±R, DVD±RW, Blu-ray (registered trademark) Disc, and so on), a semiconductor memory, or similar recording medium. As long as it is a recording medium readable by a computer or an embedded system, a storage format thereof may be in any form. In a case where the computer reads the program from the recording medium and executes the instructions described in the program on the basis of this program, the same operation as the above-described processing procedure can be realized. Of course, the computer may acquire or read the program through a network.

An operating system (OS) running on a computer on the basis of an instruction of a program installed in the computer or an embedded system from a recording medium, or Middleware (MW) such as database management software, a network, or the like may execute a part of the processing procedure. Furthermore, the recording medium in each of the embodiments is not limited to a medium independent from a computer or an embedded system and may include a recording medium in which a program transmitted via a LAN, the Internet, or the like is downloaded and stored or temporarily stored. Also, the number of recording media is not limited to one, and in a case where the processing is executed from a plurality of media, it is also included in the recording medium, and the constitution of the medium may be any constitution.

The computer or the embedded system according to each of the embodiments may be one for executing each processing in each embodiment on the basis of a program stored in a recording medium and may have any constitution including a single device such as a personal computer and a microcomputer, a system in which a plurality of devices are connected to the network, and so on. In addition, the computer in each of the embodiments is not limited to a personal computer and also includes an arithmetic processing unit, a microcomputer, and so on included in the information processing device and collectively refers to devices and apparatuses capable of realizing the functions in all the embodiments by programs.

According to at least one embodiment described above, it is possible to improve the reliability of the adhering and holding operation by having the light amount sensor for two-dimensionally detecting the light amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding device, comprising:
a sucker configured to adhere to an object, the sucker having a cavity:
a suction device configured to communicate with the sucker and to suction a gas inside the sucker to cause the sucker to adhere to the object;
an image sensor configured to two-dimensionally detect an amount of light from the object and detect light incident through the cavity; and
a controller configured to determine whether the object is in proximity to the sucker based on a two-dimensional light amount distribution detected by the image sensor and to control the suction device to perform suction when the controller determines that the object is in proximity to the sucker.

2. The holding device according to claim 1, further comprising:
an adhesion unit comprising the sucker and a support member configured to support the sucker,
wherein the image sensor is inside the adhesion unit.

3. The holding device according to claim 1, wherein the controller is further configured to estimate a distance to the object based on a change in a size of at least one of the object and a feature on a surface of the object in an image acquired by the image sensor, and control the suction device to perform suction when the estimated distance is equal to or less than a distance threshold.

4. The holding device according to claim 3, wherein the controller is further configured to set the distance threshold to a first value when a moving speed of the sucker is a first speed, and set the distance threshold to a second value larger than the first value when the moving speed of the sucker is a second speed higher than the first speed.

5. The holding device according to claim 4, further comprising:
an acceleration sensor,
wherein the controller is further configured to set the distance threshold based on a signal output from the acceleration sensor.

6. The holding device according to claim 1, further comprising:
a proximity sensor configured to detect that the object is in proximity to the sucker,
wherein the controller is further configured to control the suction device to perform suction when it is detected that the object is in proximity to the sucker based on information detected by the proximity sensor, regardless of a result of detection by the image sensor.

7. The holding device according to claim 6, further comprising:
an adhesion unit comprising the sucker and a support member configured to support the sucker,
wherein the proximity sensor is inside the adhesion unit.

8. The holding device according to claim 1, further comprising:
a lighting device,
wherein the controller is further configured to control the suction device to perform suction when a result of detection of the light amount distribution acquired by the image sensor in a state in which the lighting device is emitting light satisfies a predetermined condition.

9. The holding device according to claim 1, wherein the image sensor is substantially at a center of the sucker in a plane substantially orthogonal to a direction in which the sucker adheres to the object.

10. The holding device according to claim 1, further comprising:
a support member configured to support the sucker,
wherein the support member has an air hole which communicates with the sucker and the suction device, and the image sensor is spaced from the air hole toward the suction device.

11. A holding device, comprising:
a sucker configured to adhere to an object;
a suction device configured to communicate with the sucker and to suction a gas inside the sucker to cause the sucker to adhere to the object;
an image sensor configured to two-dimensionally detect an amount of light from the object;
a controller configured to control the suction device based on information detected by the image sensor;
an adhesion unit comprising the sucker and a support member configured to support the sucker; and
an actuator configured to move the image sensor between a first position at which the image sensor is entirely inside the adhesion unit and a second position at which at least a part of the image sensor is outside the adhesion unit.

12. A holding device, comprising:
a sucker configured to adhere to an object;
a suction device configured to communicate with the sucker and to suction a gas inside the sucker to cause the sucker to adhere to the object;
an image sensor configured to two-dimensionally detect an amount of light from the object;
a controller configured to control the suction device based on information detected by the image sensor;
a switching valve switchable between a first state in which a flow path between the suction device and the sucker is allowed to communicate with an atmospheric pressure space and a second state in which communication between the flow path and the atmospheric pressure space is blocked;
a drive device configured to perform driving of the suction device and the switching valve; and a pressure sensor configured to detect a pressure of the gas in the flow path.

13. The holding device according to claim 12, wherein the controller is further configured to stop the driving of the suction device when the pressure detected by the pressure sensor is lower than a first pressure threshold, and start the driving of the suction device when the pressure detected by the pressure sensor is higher than a second pressure threshold, and the second pressure threshold is substantially equal to or higher than the first pressure threshold.

14. A holding device, comprising:
a sucker configured to adhere to an object;
a suction device configured to communicate with the sucker and to suction a gas inside the sucker to cause the sucker to adhere to the object;
a light amount sensor configured to two-dimensionally detect an amount of light from the object;
a controller configured to control the suction device based on information detected by the light amount sensor;
a support member configured to support the sucker, wherein the support member has an air hole which communicates with the sucker and the suction device, and the light amount sensor is spaced from the air hole toward the suction device; and
an elastic member configured to support the light amount sensor with respect to the support member.

15. A transport system, comprising:
a holding device comprising a sucker configured to adhere to an object, a suction device configured to communicate with the sucker and to suction gas inside the sucker to cause the sucker to adhere to the object, a light amount sensor configured to two-dimensionally detect an amount of light from the object, and a controller configured to control the suction device based on information acquired by the light amount sensor;
a movement mechanism configured to move the holding device;
a recognition device configured to recognize the object; and
a movement mechanism controller configured to control the movement mechanism based on an output from the recognition device,
wherein the controller is further configured to determine an adhesion state between the sucker and the object based on a change in the amount of light detected by the light amount sensor.

16. A transport system, comprising:
a holding device comprising a sucker configured to adhere to an object, the sucker having a cavity, a suction device configured to communicate with the sucker and to suction a gas inside the sucker to cause the sucker to adhere to the object, an image sensor configured to two-dimensionally detect an amount of light from the object and to detect light incident through the cavity, and a controller configured to determine whether the object is in proximity to the sucker based on a two-dimensional light amount distribution detected by the image sensor and to control the suction device to perform suction when the controller determines that the object is in proximity to the sucker;
a movement mechanism configured to move the holding device;
a recognition device configured to recognize the object; and
a movement mechanism controller configured to control the movement mechanism based on an output from the recognition device.

\* \* \* \* \*